US008032646B2

(12) United States Patent
Nag et al.

(10) Patent No.: US 8,032,646 B2
(45) Date of Patent: Oct. 4, 2011

(54) ADMINISTERING A COMMUNICATION NETWORK

(75) Inventors: Siddhartha Nag, Holmdel, NJ (US); Alfred D'Souza, Lincroft, NJ (US); Naveed Alam, Freehold, NJ (US); Rakesh Patel, Fairview, NJ (US)

(73) Assignee: Prom KS Limited Liability Company, Wilmington, DE (US)

( * ) Notice: Subject to any disclaimer, the term of this patent is extended or adjusted under 35 U.S.C. 154(b) by 1206 days.

(21) Appl. No.: 11/183,156

(22) Filed: Jul. 14, 2005

(65) Prior Publication Data

US 2006/0020694 A1 Jan. 26, 2006

Related U.S. Application Data

(60) Division of application No. 09/689,222, filed on Oct. 11, 2000, now Pat. No. 7,886,054, and a continuation-in-part of application No. 09/634,035, filed on Aug. 8, 2000, now Pat. No. 7,013,338.

(60) Provisional application No. 60/221,571, filed on Jul. 28, 2000.

(51) Int. Cl.
 *G06F 15/16* (2006.01)
 *G06F 15/173* (2006.01)
(52) U.S. Cl. ......... 709/230; 709/223; 709/224; 709/238
(58) Field of Classification Search .................. None
 See application file for complete search history.

(56) References Cited

U.S. PATENT DOCUMENTS

| | | | |
|---|---|---|---|
| 5,394,522 A * | 2/1995 | Sanchez-Frank et al. | .... 709/223 |
| 5,809,282 A | 9/1998 | Cooper et al. | |
| 5,826,242 A | 10/1998 | Montulli | |
| 5,831,975 A | 11/1998 | Chen et al. | |
| 5,884,037 A | 3/1999 | Aras et al. | |
| 5,903,735 A | 5/1999 | Kidder et al. | |
| 5,958,009 A | 9/1999 | Friedrich et al. | |

(Continued)

FOREIGN PATENT DOCUMENTS

EP 1017200 11/1999

(Continued)

OTHER PUBLICATIONS

Aggarwal, Alok et al. "Efficient Routing in Optical Networks." Journal of the ACM. vol. 43, Issue 6. ACM Press. Nov. 1996. 973-1001.*

(Continued)

*Primary Examiner* — Jeffrey R Swearingen
*Assistant Examiner* — Vivek Srivastava
(74) *Attorney, Agent, or Firm* — Snell & Wilmer L.L.P.

(57) ABSTRACT

Methods and apparatus are provided for administering a communication network. In one embodiment, a first interface screen depicts nodes within a network. The nodes include a pair of media aggregation managers providing multiplexing/demultiplexing of media traffic associated with multiple application sessions between a pair of communities onto a preallocated reservation protocol session between the media aggregation managers. The media aggregation managers are visually distinguishable from other nodes. A second interface screen depicts potential paths through the network. Each potential path is capable of transferring media packets between the media aggregation managers. Via the second user interface screen, a network administrator is capable of initiating (1) path-level configuration of routers that are part of a selected potential path to cause the routers to route media packets exchanged between the pair of communities over the selected path, and (2) establishment of the preallocated reservation protocol session between the media aggregation managers.

24 Claims, 24 Drawing Sheets

U.S. PATENT DOCUMENTS

| | | |
|---|---|---|
| 5,996,013 A | 11/1999 | Delp et al. |
| 6,009,469 A | 12/1999 | Mattaway et al. |
| 6,026,443 A | 2/2000 | Oskouy et al. |
| 6,041,353 A * | 3/2000 | Hirata et al. .................. 709/224 |
| 6,046,981 A | 4/2000 | Ramamurthy et al. |
| 6,054,987 A | 4/2000 | Richardson |
| 6,061,723 A | 5/2000 | Walker et al. |
| 6,092,113 A | 7/2000 | Maeshima et al. |
| 6,104,721 A | 8/2000 | Hsu et al. |
| 6,108,310 A | 8/2000 | Wilkinson et al. |
| 6,115,372 A | 9/2000 | Dinha et al. |
| 6,125,397 A | 9/2000 | Yoshimura et al. |
| 6,154,465 A | 11/2000 | Pickett |
| 6,208,638 B1 | 3/2001 | Rieley et al. |
| 6,209,033 B1 | 3/2001 | Datta et al. |
| 6,212,562 B1 | 4/2001 | Huang et al. |
| 6,226,678 B1 | 5/2001 | Mattaway et al. |
| 6,243,376 B1 | 6/2001 | Ng et al. |
| 6,243,759 B1 | 6/2001 | Boden et al. |
| 6,259,771 B1 | 7/2001 | Kredo et al. |
| 6,298,120 B1 | 10/2001 | Civanlar et al. |
| 6,301,229 B1 | 10/2001 | Araujo et al. |
| 6,366,577 B1 | 4/2002 | Donovan et al. |
| 6,370,154 B1 * | 4/2002 | Wickham .................. 709/223 |
| 6,377,546 B1 | 4/2002 | Guerin et al. |
| 6,381,635 B1 * | 4/2002 | Hoyer et al. .................. 709/207 |
| 6,412,000 B1 | 6/2002 | Riddle et al. |
| 6,418,139 B1 | 7/2002 | Akhtar et al. |
| 6,442,615 B1 | 8/2002 | Nordenstam et al. |
| 6,463,089 B1 | 10/2002 | Chauncey et al. |
| 6,477,572 B1 * | 11/2002 | Elderton et al. .............. 709/224 |
| 6,490,249 B1 | 12/2002 | Aboul-Magd et al. |
| 6,493,348 B1 | 12/2002 | Gelman et al. |
| 6,499,027 B1 * | 12/2002 | Weinberger .................. 709/217 |
| 6,515,966 B1 | 2/2003 | Bardalai et al. |
| 6,519,254 B1 | 2/2003 | Chuah et al. |
| 6,549,940 B1 * | 4/2003 | Allen et al. .................. 709/219 |
| 6,570,867 B1 * | 5/2003 | Robinson et al. ............. 709/238 |
| 6,594,265 B1 | 7/2003 | Fichou et al. |
| 6,594,268 B1 | 7/2003 | Aukia et al. |
| 6,594,279 B1 | 7/2003 | Nguyen et al. |
| 6,606,668 B1 | 8/2003 | MeLampy et al. |
| 6,611,516 B1 | 8/2003 | Pirkola et al. |
| 6,639,981 B1 | 10/2003 | Dunn, Jr. et al. |
| 6,640,248 B1 | 10/2003 | Jorgensen et al. |
| 6,643,258 B1 | 11/2003 | Ise et al. |
| 6,647,208 B1 | 11/2003 | Kirby et al. |
| 6,654,803 B1 * | 11/2003 | Rochford et al. ............. 709/224 |
| 6,667,968 B1 | 12/2003 | Tran |
| 6,675,387 B1 * | 1/2004 | Boucher et al. ............... 709/218 |
| 6,678,729 B1 | 1/2004 | Ahoor |
| 6,680,943 B1 | 1/2004 | Gibson et al. |
| 6,690,678 B1 | 2/2004 | Basso et al. |
| 6,714,987 B1 | 3/2004 | Amin et al. |
| 6,728,365 B1 | 4/2004 | Li et al. |
| 6,738,383 B1 | 5/2004 | Kliland et al. |
| 6,744,767 B1 | 6/2004 | Chiu et al. |
| 6,751,677 B1 | 6/2004 | Ilnicki et al. |
| 6,771,661 B1 | 8/2004 | Chawla et al. |
| 6,775,701 B1 | 8/2004 | Pan et al. |
| 6,798,786 B1 | 9/2004 | Lo et al. |
| 6,804,224 B1 | 10/2004 | Schuster et al. |
| 6,831,932 B1 | 12/2004 | Boyle et al. |
| 6,870,845 B1 | 3/2005 | Bellovin et al. |
| 6,904,110 B2 | 6/2005 | Aras et al. |
| 6,909,708 B1 | 6/2005 | Krishnaswamy et al. |
| 6,910,074 B1 | 6/2005 | Amin et al. |
| 6,925,076 B1 | 8/2005 | Dalgic et al. |
| 6,937,566 B1 | 8/2005 | Forslow |
| 6,940,814 B1 | 9/2005 | Hoffman |
| 6,967,958 B2 | 11/2005 | Ono et al. |
| 6,973,027 B1 | 12/2005 | Shaffer et al. |
| 6,977,896 B1 | 12/2005 | Kobayashi |
| 6,985,957 B2 | 1/2006 | Fujita |
| 7,002,993 B1 | 2/2006 | Hohaban et al. |
| 7,013,338 B1 | 3/2006 | Nag et al. |
| 7,016,375 B1 | 3/2006 | Rosenberg et al. |
| 7,051,070 B2 | 5/2006 | Tuttle et al. |
| 7,072,295 B1 | 7/2006 | Benson et al. |
| 7,075,915 B1 | 7/2006 | Gustke |
| 7,124,187 B1 | 10/2006 | Kodialam et al. |
| 7,136,377 B1 | 11/2006 | Tweedly et al. |
| 7,143,152 B1 * | 11/2006 | Elman et al. .................. 709/223 |
| 7,209,473 B1 | 4/2007 | Mohaban et al. |
| 7,221,384 B2 | 5/2007 | Mueller et al. |
| 7,266,683 B1 | 9/2007 | Nag |
| 7,266,832 B2 | 9/2007 | Miller |
| 7,269,657 B1 | 9/2007 | Alexander et al. |
| 7,274,662 B1 | 9/2007 | Kalmanek, Jr. et al. |
| 7,280,528 B1 | 10/2007 | Polit et al. |
| 7,305,000 B2 | 12/2007 | Horiba |
| 7,480,305 B1 | 1/2009 | Somasundaram |
| 7,606,146 B1 | 10/2009 | Pan et al. |
| 7,693,062 B2 | 4/2010 | Perkins et al. |
| 7,774,468 B1 | 8/2010 | Nag et al. |
| 2002/0015387 A1 | 2/2002 | Houh |
| 2002/0030696 A1 | 3/2002 | Twinkwalder et al. |
| 2002/0049841 A1 | 4/2002 | Johnson et al. |
| 2002/0049860 A1 | 4/2002 | Koistinen |
| 2002/0120741 A1 | 8/2002 | Webb et al. |
| 2002/0152305 A1 | 10/2002 | Jackson et al. |
| 2002/0174227 A1 | 11/2002 | Hartsell et al. |
| 2002/0188720 A1 | 12/2002 | Terrell et al. |
| 2002/0199012 A1 | 12/2002 | Cable et al. |
| 2003/0026423 A1 | 2/2003 | Unger et al. |
| 2003/0028535 A1 | 2/2003 | Sheldon et al. |
| 2003/0046396 A1 | 3/2003 | Richter et al. |
| 2003/0053463 A1 | 3/2003 | Vikberg et al. |
| 2003/0091049 A1 | 5/2003 | Abe et al. |
| 2003/0126287 A1 | 7/2003 | Charny et al. |
| 2003/0219029 A1 | 11/2003 | Pickett |
| 2004/0039820 A1 | 2/2004 | Colby et al. |
| 2004/0057435 A1 | 3/2004 | Ruyle et al. |
| 2004/0073641 A1 | 4/2004 | Minhazuddin et al. |
| 2004/0172464 A1 | 9/2004 | Nag |
| 2004/0205239 A1 | 10/2004 | Doshi et al. |
| 2005/0018652 A1 | 1/2005 | Crouch et al. |
| 2005/0044161 A1 | 2/2005 | Fujita |
| 2005/0083842 A1 | 4/2005 | Yang et al. |
| 2005/0128951 A1 | 6/2005 | Chawla et al. |
| 2005/0138204 A1 | 6/2005 | Iyer et al. |
| 2005/0198261 A1 | 9/2005 | Durvasula et al. |
| 2005/0210292 A1 | 9/2005 | Adams et al. |
| 2006/0020694 A1 | 1/2006 | Nag et al. |
| 2006/0056298 A1 | 3/2006 | Nag et al. |
| 2007/0168517 A1 | 7/2007 | Weller et al. |
| 2009/0296734 A1 | 12/2009 | Nag |

FOREIGN PATENT DOCUMENTS

| | | |
|---|---|---|
| WO | WO 0077988 | 12/2000 |
| WO | 005115 | 1/2001 |
| WO | WO-0105115 | 1/2001 |
| WO | WO 0131939 | 5/2001 |
| WO | 0217036 | 2/2002 |
| WO | WO 02/13023 | 2/2002 |

OTHER PUBLICATIONS

Maxemchuk, N. "Applying packet techniques to cellular radio." Wireless Networks. vol. 5, Issue 6. Dec. 1999. 519-536. Kluwer Academic Publishers.*

Lee, K.; "Adaptive network support for mobile multimedia", 1.sup.st Annual International Conference on Mobile Computing and Networking, ISBN 0897918142, 1945, 13 pages.

Terzis, A. et al.; "Reservations for aggregate traffic: experiences from an RSVPtunnels implementation", 1998 Sixth 6. sup.th International Workshop on Quality of Service (IWQoS), ISBN 0780344820, 1998, 3 pages.

Terzis, A. et al.; "Request for Comments (RFC) 2746, RSVP Operation Over IP Tunnels", Jan. 2000, 25 pages.

"HP OpenView Performance Insight Report Pack for Infrastructure Usage"; 2004; Hewlett-Packard; 6 pages.

"HP OpenView problem diagnosis 1.1 product brief"; Hewlett-Packard; 2002; 4 pages.

U.S. Appl. No. 11/038,445, entitled "Differentiated Services (DiffServ) traffic admission control", by Nag et al., filed on Jan. 18, 2005.

Almesberger, et al., "Scalable Resource Reservation for the Internet"; IEEE, '997; pp. 18-27.

"SIP: Session Initiation Protocol", updated Aug. 2004, printed from Internet at: http://www.cs.columbia.edu/sip (1 page).

"SIP: Session Initiation Protocol—Implementations, News," updated Aug. 2004, printed from Internet at: http://www.cs.columbia.edu/sip/news.html (4 pages).

Kankkunen, et al.; "VoIP over MPLS Framework Internet Draft"; Internet Engineering Task Force; 2000; retrieved from Internet: http://tools.ietf.org/html/draft-kankkunen-vompls-fw-01; 58 pages.

Baker, et al.; "Aggregation of RSVP for IPv4 and IPv4 and IPv6 Reservations"; Sep. 2001; retrieved from http://ietf.org/rfc/rfc3175.txt?number=3175; 34 pages.

Braden, et al., "RFC2205—Resource Reservation Protocol (RSVP)—Version 1 Functional Specification"; retrieved from Internet: http://www.faqs.org/rfcs/rfc2205.html; Sep. 1997; 79 pages.

Zhu, et al.; "RFC 2190—RTP Payload Format for H.263 Video Streams"; retrieved from Internet: http://faqs.org/rfcs/rfc2190.html; Sep. 1997; 10 pages.

Kim, et al.; "A Dynamic Admission Control Scheme in a DiffServ Domain"; Workshop on High Performance Switching and Routing; 2002; pp. 183-187.

Siler, et al.; "Measurement-Based Admission Control and Monitoring for Statistical Rate-Latency Guarantees"; Proceedings of the 38th Conference on Decision & control; Phoenix, AZ; Dec. 1999; 6 pages.

Handley, M., et al., SIP: Session Initiation Protocol, Mar. 1999, printed from Internet at: ftp://ftp.isi.edu/in-notes/rfc2543.txt (143 pages).

"Measures network performance and predicts the impact of changes"; Chariot; 2004; NetIQ Corporation; 2 pages.

"NetIQ: Chariot"; 1993-2004; NetIQ Corporation; retrieved from Internet: http://www.netiq.com/products/chr/default.asp?print=true; 1 page.

"Delivers comprehensive service management for Windows, UNIX and Linux systems and applications"; NetIQ AppManager Suite; 2004; NetIQ Corporation; 4 pages.

"Delivers Enterprise VoIP QoS and Management"; AppManager for VoIP; 2004; NetIQ Corporation; 4 pages.

Hwang, Junseok; "A Market-Based Model for the Bandwidth Management of IntServ-DiffServ QoS Interconnection: A Network Economic Approach"; 2000, pp. 1-204.

"NetIQ: AppManager for VoIP"; 1993-2004; NetIQ Corporation; retrieved from Internet: http://www.netiq.com/products/am/modules/voip.asp?print=true; 1 page.

Pearsall, et al.; "Doing a VoIP Assessment with Vivinet Assessor"; NetIQ Work Smarter; 2001-2002; NetIQ; 20 pages.

"Delivers the leading software solution for assessing a data network's readiness for VoIP"; Vivinet Assessor; NetIQ Corp.; 2004; 2 pages.

"Vivinet Assessor"; NetIQ; retrieved from Internet at http://www.netiq.com/products/va/default.asp?print=true; 1993-2004; 1 page.

"Pinpoints VoIP quality problems in minutes"; Vivinet Diagnostics; NetIQ Corporation; 2004; 2 pages.

"NetIQ: Vivinet Diagnostics"; NetIQ Corporation; retrieved from Internet: http://www.netiq.com/products/vd/default.asp?print=true; 1993-2004; 1 page.

"NetIQ: VoIP Management Solution"; NetIQ Corporation; 1993-2004; retrieved from Internet: http://www.netiq.com/solutions/voip/default.asp?print=true; 1 page.

"Micromuse: Products and Solutions—Netcool Suite Overview"; Micromuse, Inc.; 2004; printed from Internet: http://www.micromuse.com/products_sols/index.html; 9 pages.

"Netcool Solutions for Voice Over IP: Realtime Service Quality Management for IP Telephony Services"; Micromuse, Inc.; not dated.

"Netcool Solutions for Enterprise: End-to-End Business and Service Assurance"; Micromuse, Inc.; 7 pages; not dated.

"Netcool/System Service Monitors White Paper: Including Netcool/Applications Service Monitors"; 2003; Micromuse, Inc.; 8 pages.

"Netcool/Monitors Product Family—Realtime and Trended Performance, Status and Service Monitoring"; 2004; Micromuse, Inc.; 4 pages.

"Netcool/Usage Service Monitors White Paper (Netcool/USMs)"; 2003; Micromuse, Inc.; 11 pages.

"Netcool/Precision for IP Networks: Discovery and Topology-Based RCA"; Micromuse, Inc.; 2 pages.

"Realtime Event Management for Business and Service Assurance"; Micromuse, Inc.; 4 pages; not dated.

Farrell; "Grappling with Management of IP Telephony"; Internet Telephony; May 2004; 2 pages.

"NetIQ VoIP Manager Connector for Netcool/OMNIbus"; Micromuse, Inc.; 1 page; not dated.

Allen; "Putting new service management tactics to work: Service providers can make smarter use of service management technology"; ServerWorld; vol. 16, No. 4; Apr. 2002; 3 pages.

"HP OpenView Network Services Management—Business Blueprint"; HP Development Company; 2004; 6 pages.

"Management Software—Alliance with Cisco Systems, Inc."; 2004; Hewlett-Packard Development Company, L.P.; printed from Internet at http://www.openview.hp.com/cgi-bin/pf-new.cgi?IN=ho//products/nnm/prod__nnm__0002.html; 1 page.

"Smart Way 2004"; Cisco Systems and Hewlett-Packard; 2004; 4 pages.

"HP OpenView: Network Node Manager Smart Plug-in for Advanced Routing 1.0"; Data sheet; 2003-2004; Hewlett-Packard Development Company, L.P.; 4 pages.

"HP OpenView Performance Insight Report Pack for IP Telephony 1.2"; 2004; Hewlett-Packard Development Company, L.P.; 8 pages.

"HP OpenView glanceplus and glanceplus pak product brief"; 2003, Hewlett-Packard; 6 pages.

"HP OpenView Performance Manager, Performance Monitor and Performance Agent data sheet"; 2003; Hewlett-Packard Development Company, L.P.; 4 pages.

"HP OpenView Service Quality Manager 1.1 data sheet"; Hewlett-Packard Development Company, L.P.; 2003; 4 pages.

"HP OpenView service information portal 3.1 product brief"; Hewlett-Packard; 2003; 4 pages.

"HPSR 2002 Technical Program"; http://www.ieice.org/hpsr2002/detail.html; 2003; pp. 1-8.

"MeraVoice over IP Solutions, VOIP Technology and Product: VoIP Glossary"; http://www.mera-voip.com/support/glossary.php; 2003; pp. 1-6.

"Non-Final Office Action", U.S. Appl. No. 09/634,035, (Mar. 26, 2004), 16 Pages.

"Final Office Action", U.S. Appl. No. 09/634,035, (Nov. 8, 2004), 26 Pages.

"Notice of Allowance", U.S. Appl. No. 09/634,035, (Jul. 22, 2005), 6 pages.

"Final Office Action", U.S. Appl. No. 11/267,922, (May 14, 2009), 14 pages.

"Non Final Office Action", U.S. Appl. No. 11/267,922, (Sep. 22, 2008), 10 pages.

"Advisory Action", U.S. Appl. No. 09/689,222, (Mar. 22, 2005), 3 pages.

"Advisory Action", U.S. Appl. No. 09/689,222, (Jun. 5, 2006), 3 pages.

"Final Office Action", U.S. Appl. No. 09/689,222, (Nov. 10, 2004), 12 pages.

"Final Office Action", U.S. Appl. No. 09/689,222, (Jul. 26, 2005), 7 pages.

"Final Office Action", U.S. Appl. No. 09/689,222, (Jul. 31, 2008), 8 pages.

"Non Final Office Action", U.S. Appl. No. 09/689,222, (Feb. 9, 2004), 13 pages.

"Non Final Office Action", U.S. Appl. No. 09/689,222, (Jan. 30, 2008), 10 pages.

"Non Final Office Action", U.S. Appl. No. 09/689,222, (Jul. 25, 2008), 10 pages.

"Non Final Office Action", U.S. Appl. No. 09/689,222, (Jan. 27, 2009), 9 pages.

"Restriction Requirement", U.S. Appl. No. 09/689,222, (Apr. 5, 2005), 5 pages.

"Notice of Allowance", U.S. Appl. No. 10/701,017, (Mar. 6, 2009), 6 pages.

"Notice of Allowance", U.S. Appl. No. 10/701,017, (Nov. 14, 2008),9 pages.
"Notice of Allowance & Examiner Amendment with Allowed Claims", U.S. Appl. No. 10/701,017, (Jul. 2, 2008),17 pages.
"Non-Final Office Action", U.S. Appl. No. 10/701,017, (Aug. 24, 2005),11 pages.
"Non Final Office Action", U.S. Appl. No. 10/206,402, (Feb. 8, 2006),22 pages
"Non Final Office Action", U.S. Appl. No. 10/206,402, (Sep. 14, 2006),8 pages.
"Non Final Office Action", U.S. Appl. No. 10/206,402, (Apr. 12, 2007),7 pages.
"Notice of Allowance", U.S. Appl. No. 10/206,402, (Jun. 21, 2007),20 pages.
"International Search Report", International Application No. PCT/US2001/024878, (Dec. 19, 2001),3 pages.
"International Search Report", International Application Serial No. PCT/US2003/035024, (May 28, 2004),4 pages.
"European Search Report", Application No. EP03768594, (Mar. 24, 2006),2 pages.
"Non-Final Office Action", U.S. Appl. No. 11/038,445, (Feb. 25, 2009),25 pages.
"Vivinet Assessor; NetIQ", retrieved from Internet at. http://netig.com/products/va/default.asp?print=true;, 1993-2004 NetIQ Corporation,(1993-2004), 1 page.
"Smart Way 2004", *Cisco Systems and Hewlett-Packard*; 2004, (2004),4 pages.
"Final Office Action", U.S. Appl. No. 11/038,445, (Oct. 15, 2008),22 pages.
"Non-Final Office Action", U.S. Appl. No. 11/038,445, (May 7, 2008),8 pages.
"Allowed Claims", U.S. Appl. No. 10/701,017, (Mar. 6, 2009),4 pages.
"Final Office Action", U.S. Appl. No. 11/038,445, (Oct. 1, 2009),16 pages.
"Non-Final Office Action", U.S. Appl. No. 11/267,922, (Oct. 7, 2009),15 pages.
"International Search Report", International Application No. PCT/US2006/016094, (Aug. 22, 2007), 3 pages.
"Non Final Office Action", U.S. Appl. No. 11/409,661, (Oct. 24, 2008), 11 pages.
"Final Office Action", U.S. Appl. No. 11/409,661, (Jul. 24, 2009), 20 pages.
"Advisory Action", U.S. Appl. No. 11/409,661, (Oct. 13, 2009), 3 pages.
"Notice of Allowance", U.S. Appl. No. 10/701,017, (Oct. 26, 2009), 4 pages.
"Advisory Action", U.S. Appl. No. 11/038,445, (Dec. 16, 2009), 3 pages.
"Notice of Allowance", U.S. Appl. No. 10/701,017, (Dec. 31, 2009), 4 pages.
"Final Office Action", U.S. Appl. No. 11/267,922, (Feb. 26, 2010),19 pages.
"Notice of Allowance", U.S. Appl. No. 09/689,222, (Jan. 27, 2010), 6 pages.
"Notice of Allowance", U.S. Appl. No. 11/038,445, (Mar. 26, 2010), 8 pages.
"Notice of Allowance", U.S. Appl. No. 09/689,222, (Jun. 15, 2010), 17 pages.
"Final Office Action", U.S. Appl. No. 09/689,222, (Nov. 10, 2009), 7 pages.
"Notice of Allowance", U.S. Appl. No. 10/701,017, (Apr. 6, 2010), 4 pages.
Baker, L., et al., Aggregation of RSVP for IPv4 and IPv6 Reservations, Sep. 2001, printed from Internet at: http://www.ietf.org/rfc/rfc3175.txt?number=3175 (34 pages).
Braden, R., et al., RFC2205—Resource ReSerVation Protocol (RSVP)—Version 1 Functional Specification, Sep. 1997, printed from Internet at: http://www.faqs.org/rfcs/rfc2205.html (79 pages).
Zhu, C., et al., RFC 2190—RTP Payload Format for H.263 Video Streams, Sep. 1997, printed from Internet at: http://www.faqs.org/rfcs/rfc2190.html (10 pages).

SIP: Session Initiation Protocol, updated Aug. 2004, printed from Internet at: http://www.cs.columbia.edu/sip (1 page).
SIP: Session Initiation Protocol—Implementations, News, updated Aug. 2004, printed from Internet at: http://www.cs.columbia.edu/sip/news.html (4 pages).
Measures network performance and predicts the impact of changes, Chariot, 2004, NetIQ Corporation (2 pages).
NetiQ: Chariot, 1993-2004, NetIQ Corporation, printed from Internet at: http://www.netiq.com/products/chr/default.asp?print=true (1 page).
Delivers comprehensive service management for windows, UNIX and Linux systems and applications, NetIQ AppManager Suite, 2004, NetIQ Corporation (4 pages).
Delivers Enterprise VoIP QoS and Management, AppManager for VoIP, 2004, NetIQ Corporation (4 pages).
NetIQ's VoIP Management Solution, 2004, NetIQ Corporation (2 pages).
NetIQ: Appmanager for VoIP, 1993-2004, NetIQ Corporation, printed from the Internet at: http://www.netiq.com/products/am/modules/voip.asp?print=true (1 page).
Pearsall, S., et al., Doing a VoIP Assessment with Vivinet Assessor, netiQ Work Smarter, 2001-2002, NetIQ Corporation (19 pages).
Delivers the leading software solution for assessing a data network's readiness for VoIP, Vivinet Assessor, 2004, NetIQ Corporation (2 pages).
NetIQ: Vivinet Assessor, 1993-2004, NetIQ Corporation, printed from the Internet at: http://www.netiq.com/products/va/default.asp?print=true (1 pages).
Pinpoints VoIP quality problems in minutes, Vivinet Diagnostics, 2004, NetIQ Corporation (2 pages).
NetIQ: Vivinet Diagnostics, 1993-2004, NetIQ Corporation, printed from the Internet at: http://www.netiq.com/products/vd/default.asp?print=true (1 page).
NetIQ: VoIP Management Solution, 1993-2004, NetIQ Corporation, printed from the Internet at:: http//www.netiq.com/solutions/voip/default.asp?print=true (1 page).
Micromuse: Products & Solutions—Netcool Suite Overview, 2004, Micromuse. Inc., printed from the Internet at: http://www.micromuse.com/products_sols/index.html (9 pages).
Netcool Solutions for Voice Over IP, Realtime Service Quality Management for IP, Telephony Services, Micromuse, Inc. (4 pages).
Netcool Solutions for Enterprise, End-To-End Business and Service Assurance, Micromuse, Inc. (6 pages), retrieved from http://web.archive.org/web/2005025140359/www.micromuse.com/downloads/pdf_lit/enterprise.pdf, May 2005.
Netcool/System Service Monitors White Paper, Including Netcool/Applications Service Monitors, 2003, Micromuse, Inc. (8 pages).
Netcool/Monitors Product Family—Realtime and Trended Performance, Status and Service Monitoring, 2004, Micromuse, Inc. (4 pages).
Netcool/Usage Service Monitors White Paper (Netcool/USMs), 2003, Micromuse, Inc. (11 pages).
Netcool/Precision for IP Networks: Discovery & Topology-/Based /RCA, Micromuse, Inc., (2 pages), retrieved from http://web.archive.org/web/20040716014651/www.micromuse.com/downloads/pdf_lit/Precision_IP.pdf, Jul. 2004.
Realtime Event Management for Business and Service Assurance, Micromuse, Inc. (4 pages), retrieved from http://web.archive.org/web/20040715224531/www.micromuse.com/downloads/pdf_lit/omnibus_36_final.pdf, Jul. 2004.
Farrell, C., Grappling With Management of IP Telephony, Internet Telephony, May 2004, Technology Marketing Corporation (2 pages).
NetIQ VoIP Manager Connector for Netcool/OMNIbus, Micromuse, Inc. (1 page), retrieved from http://web.archive.org/web/20041206164545/www.micromuse.com/downloads/pdf/integretion/netip_VoIP.pdf, Dec. 2004.
Allen, P., Putting new service management tactics to work, Service providers can make smarter use of service management technology, ServerWorld, vol. 16, No. 4, Apr. 2002 (3 pages).
HP OpenView Network Services—Management—Business blueprint, 2004, Hewlett-Packard Development Company, L.P. (6 pages).
Management Software—IP telephony management solutions overview & features, 2004, Hewlett-Packard Development Company, L.P., printed from the Internet at: http://www.openview.hp.com/cgi-bin/pf-new.cgi?IN=hp//products/nnm/prod_nnm_0002.h... (1 page).

Management Software—Alliance with Cisco Systems, Inc., 2004, Hewlett-Packard Development Company, L.P., printed from the Internet at: http://www.openview.hp.com/cgi-bin/pf-new.cgi?IN=hp//partners/alliances/pall_0001.html (2 pages).

Cisco HP Smart Way 2004 Solution Brief, 2003, Cisco Systems and Hewlett-Packard (4 pages).

HP OpenView, Network Node Manager Smart Plug-in for Advanced routing 1.0 Data sheet, 2003-2004, Hewlett-Packard Development Company, L.P. (4 pages).

HP OpenView Performance Insight Report Pack for IP Telephony 1.2, 2004, Hewlett-Packard Development Company, L.P. (8 pages).

HP OpenView, glanceplus and glanceplus pak product brief, 2003, Hewlett-Packard Company (6 pages).

HP OpenView, Performance Manager, Performance Monitor and Performance Agent data sheet, 2003, Hewlett-Packard Development Company, L.P. (4 pages).

HP Open View, Service Quality Manager 1.1 data sheet, 2003, Hewlett-Packard Development Company, L.P. (4 pages).

HP OpenView, service information portal 3.1 product brief, 2003, Hewlett-Packard Company (4 pages).

HP OpenView, problem diagnosis 1.1 product brief, 2002, Hewlett-Packard Company (4 pages).

HP OpenView Performance Insight Pack for Infrastructure Usage, 2004, Hewlett-Packard Development Company, L.P. (6 pages).

HP OpenView, Network Node Manager Smart Plug-in for Advance Routing 1.0 Data sheet, 2003-2004, Hewlett-Packard Development Company, L.P. (4 pages).

HP OpenView, Customer Views 1.4 for Network Node Manager data sheet, 2003, Hewlett-Packard Development Company, L.P. (4 pages).

Hewlett-Packard OpenView—about Hewlett-Packard OpenView, 2004, Hewlett-Packard Development Company, L.P., printed from the Internet at: http://www.managementsoftware.hp.com/cgi-bin/pf-new.cgi?IN=hp//about/index.html (2 pages).

HP OpenView, service quality manager product overview, 2003, Hewlett-Packard Company (16 pages).

Intelligent Diagnostics for Networks, Beyond root-cause analysis, A white paper from HP—preliminary*, 2003, Hewlett-Packard Development Company, L.P. (12 pages).

Hp OpenView, Operations 7.x for Windows, Firewall Configuration white paper, 2002, Hewlett-Packard Company (60 pages).

Gain strategic advantage with HP IT Service Management, White paper, 2003, Hewlett-Packard Development Company, L.P. (8 pages).

Harbaum, T., et al., Layer 4+Switching with QOS Support for RTP and HTTP, 1999, Global Telecommunications Conference—Globecom '99, pp. 1591-1596.

Braden, R., et al. RFC2205-Resource Reservation Protocol (RSVP), Sep. 1997.

Eder, M. et al. Service Management Architectures Issues and Review. Jan. 2001. Printed from Internet at ftp://ftp.isi.edu/in-notes/rfc3052.txt (12 pages).

Eder, M. et al. IP Service Management in the QoS Network. Nov. 2001. Printed from Internet at http://search.ietf.org/internet-drafts/draft-irtf-smrg-ipsmf-01.txt (15 pages).

"HP OpenView CustomerViews 1.4 for Network Node Manager data sheet"; Hewlett-Packard Development Company; 2003; 4 pages.

"Hewlett-Packard OpenView—About Hewlett-Packard OpenView"; Hewlett-Packard Development Company; 2004; printed from Internet at http://www.managementsoftware.hp.com/cgi-bin/pf-new.cgi?IN=hp//about/index.html; 2 pages.

"HP OpenView service quality manager product overview"; Hewlett-Packard Development Company; 2003; 17 pages.

"Intelligent Diagnostics for Networks—Beyond Root-Cause Analysis—A white paper from HP—preliminary"; Hewlett-Packard Development Company; 2003; 13 pages.

"HP OpenView Operations 7.x for Windows—Firewall Configuration white paper, Version 2.2"; Aug. 2003; Hewlett-Packard; 61 pages.

"Gain strategic advantage with HP IT Service Management—white paper"; Hewlett-Packard; 2003; 9 pages.

Harbaum, et al., "Layer 4+ Switching with QOS Support for RTP and HTTP"; Global Telecommunications Conference 1999; pp. 1591-1596.

"AdventNet Products"; AdventNet; downloaded from http://a1132.g.akamai.net/7/1132/1581/1382cd01af18b6/www.adventnet.com/products.html; downloaded on Sep. 13, 2000; 2 pages.

"Network Node Manager"; HP OpenView; downloaded from http://www.openview.hp.com/products/nnm on Sep. 13, 2000; 2 pages.

"Network Node Manager Interactive Demos"; downloaded from http://ovweb1.external.hp.com/nnminteract on Sep. 13, 2000; 2 pages.

"Cisco Network Management"; downloaded from http://www.cisco.com/warp/public/44/jump/network_management.shtml on Sep. 13, 2000; 5 pages.

Greenstein; "Transporting Voice Traffic Over Packet Networks"; International Journal of Network Management; vol. 8; 1998 pp. 227-234.

Muller; "Improving and Managing Multimedia Performance over TCP/IP Nets"; International Journal of Network Management; vol. 8; 1998; pp. 356-367.

"Management Software—IP Telephony Management Solutions—Overview and Features"; 2004; Hewlett-Packard; printed from Internet at http://www.openview.hp.corn/cgi-bin/pf-new.cgi?IN=hp//products/nnm/prod_nnm_0002.html; 1 page.

"Entities"; http://ai3.asti.dost.gov.ph/h.323/entities.htm; 2003; pp. 1-6.

"Cisco IOS Software Release 12.0 T"; http://www.cisco.com/en/US/products/sw/iosswrel/ps1830/products; 2003; pp. 1-12.

"The Drivers for Voice Over IP"; http://www.voip-calculatorcom/drivers.html; 2003; pp. 1-3.

"Voice over IP Protocols for Voice Transmission"; http://voip-calculator.com/protocols.html; 2003; pp. 1-6.

"H.323 Primer —An Introduction to H.323"; http://voip-calculator.com/h323primer.html; 2003; pp. 1-5.

"Administrivia; Last Time; Endpoint Admission Control Paper; This Paper: Explore Tradeoffs for This Type of Solution"; Suny-Binghamton; 2003; Lecture #24; 8 pages.

"DiffServ—the Scalable End-to-End QoS Model"; Cisco Systems; 2001; pp. 1-19.

"Implementing DiffServ for End-to-End Quality of Service"; Cisco IOS Release 12.1(5)T; pp. 1-22, submitted Nov. 24, 2008.

"Low Latency Queueing"; Cisco IOS Release 12.0(26)S; pp. 1-14, submitted Nov. 24, 2008.

Blake, et al., "An Architecture for Differentiated Services"; The Internet Society; http://www.ietf.org/rfc/rfc2475.txt; 1998; pp. 1-34.

Blefari-Melazzi, et al.; "Charging IP Network Services in a DiffServ Environment"; Proceedings of Advanced Internet Charging and QoS Technology 2001 (ICQT'01) Workshop, Vienna, Austria, Sep. 2001; 11 pages.

Jamalipour, et al.; "Next-Generation Broadband Wireless Networks and Navigation Services"; Guest Editorial; http://www.comsoc.org/livepubs/ci1/Public/2002/Feb/gstedjamal.html; 2003; pp. 1-4.

Roaten; "IP Telephony and EIC a Technical Overview"; Interactive Intelligence; 1998; pp. 1-8.

Tewari, et al.; "A New Call Admission Control Scheme for Real-Time Traffic in Wireless Networks"; TENCON 2003. Conference on Convergent Technologies for Asia-Pacific Region; vol. 4, Issue , Oct. 15-17, 2003 pp. 1585-1589.

USPTO; Office Action dated Feb. 3, 2011 in U.S. Appl. No. 12/873,075.

USPTO; Office Action dated Feb. 23, 2011 in U.S. Appl. No. 12/538,677.

USPTO; Final Office Action dated Jul. 9, 2010 in U.S. Appl. No. 11/409,661.

USPTO; Office Action dated Jan. 12, 2010 in U.S. Appl. No. 11/409,661.

USPTO; Office Action dated Oct. 21, 2010 in U.S. Appl. No. 11/409,661.

USPTO; Final Office Action dated Mar. 25, 2011 in U.S. Appl. No. 11/409,661.

Braden R. RFC 2205. Network Working Group, 1997. 150 Pages.

* cited by examiner

☐ NMS Administration
    Read me

⚲ ☐ Network Administration
    Network Discovery   201
    Network Map   202
    Bandwidth Allocation   203
    Bandwidth Deallocation   204

⚲ ☐ Miscellaneous
    Configured Communities   205
    BW on Link       206
    RSVP trace       207

*FIG. 2*

ADMINISTERING A COMMUNICATION NETWORK

This patent application is a divisional of U.S. patent application Ser. No. 09/689,222, filed on Oct. 11, 2000. This patent application is a continuation-in-part of U.S. patent application Ser. No. 09/634,035 filed on Aug. 8, 2000, now U.S. Pat. No. 7,013,338, which claims the benefit of priority of U.S. Provisional Application No. 60/221,571 filed on Jul. 28, 2000.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention are concerned with management of a communication network, such as a Voice over Internet Protocol (VoIP) network. More particularly, embodiments of the present invention are directed to a Graphical User Interface (GUI) and methods that enables a system manager to initialize, based on predicted link utilization, a plurality of routers and media aggregation managers existing on a selected communication path. The initialization provides the media aggregation managers with reservation protocol session parameters and bandwidth allocation requirements for a predetermined schedule of usage over the communication network.

2. Description of the Related Art

Current network management tools such as Hewlett Packard's OpenView and AdventNet, have typically been used by System Administrators for detecting and analyzing faults that occur within a network. The programs generally discover a network and each node or router on the network submits to the administrator if and where faults exist in the network so that the System Administrator can address the problematic faults. The System administrator can select an individual router and provision the router through the Open View and AdventNet GUI. When provisioning a router, the existing tools utilize a standard protocol such as Simple Network Management Protocol (SNMP) or a command line interface (CLI). The standard protocol is typically communicated to the provisioning tool like Open View or AdventNet by the router during the network discovery so that the protocol utilized for provisioning the router is hidden from the user. Provisioning a router includes router control parameters such as assigning an IP address to a router or assigning bandwidth for certain types of communications through the router.

One of the problems with the existing network management tools is that they do not provide for administration of VoIP networks. Another disadvantage of the current tools is that they do not allow a user to initialize multiple routers along a selected path through a communication network.

SUMMARY

Methods and apparatus are described for administering a communication network, such as a VoIP network. In one embodiment, a first user interface screen is displayed that graphically depicts multiple nodes within a network. The nodes depicted include at least a pair of media aggregation managers configured to provide multiplexing/demultiplexing of media traffic associated with multiple application sessions between a pair of communities onto a preallocated reservation protocol session between the pair of media aggregation managers. Within the first user interface screen, the pair of media aggregation managers are visually distinguishable from other nodes on the network. A second user interface screen is displayed that graphically depicts multiple potential paths through the network. Each potential path represents a path over which media packets are capable of being transferred between the pair of media aggregation managers. By way of the second user interface screen, a network administrator is capable of initiating (1) path-level configuration of a set of routers that are part of a selected path of the multiple potential paths to cause the set of routers to route media packets exchanged between terminals of the pair of communities over the selected path via the pair of media aggregation managers, and (2) establishment of the preallocated reservation protocol session between the pair of media aggregation managers.

Other features of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 2 is a menu of available screens for a network administration GUI according to one embodiment of the present invention.

DETAILED DESCRIPTION

Figure 1:
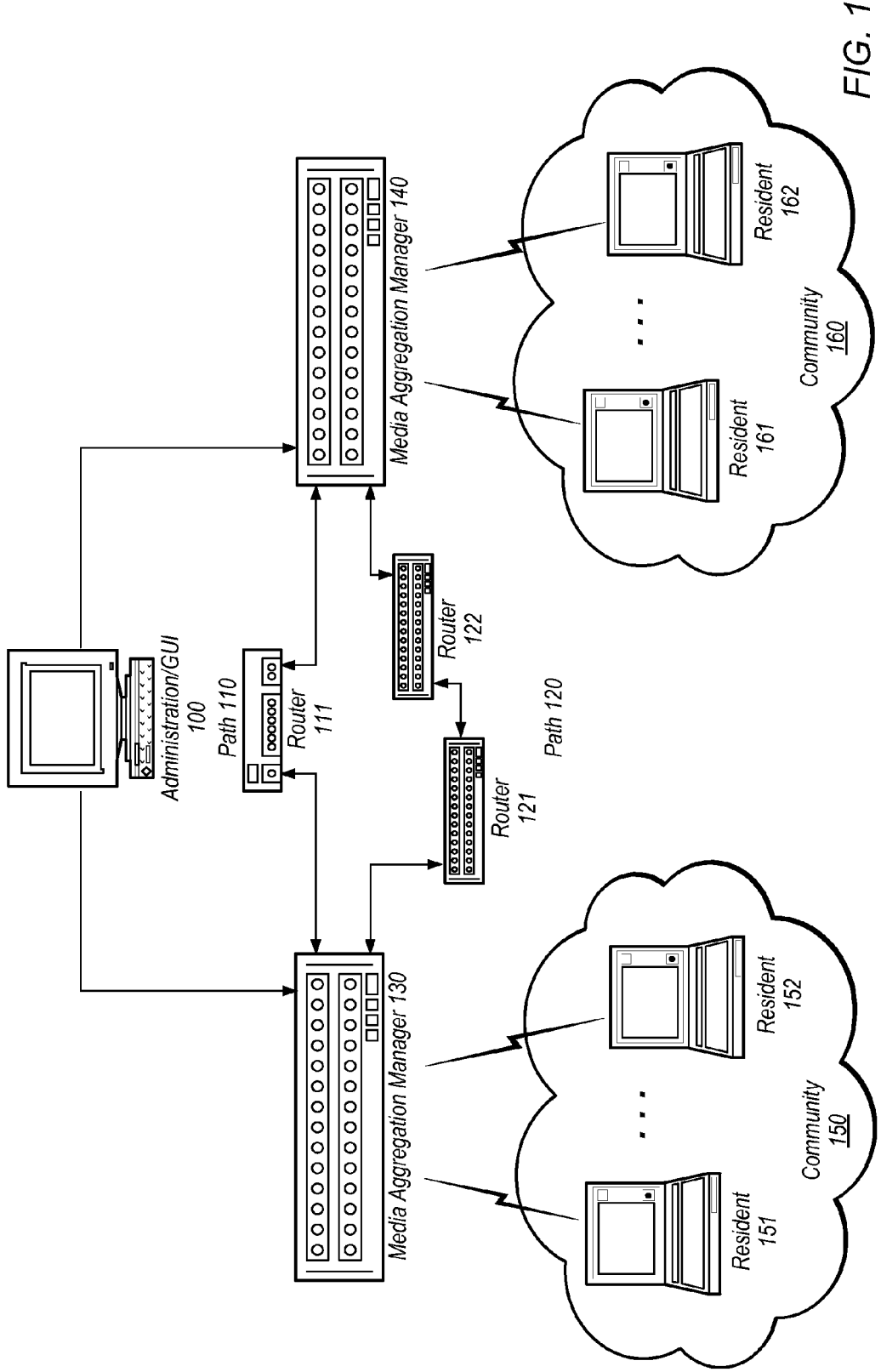
FIG. 1 conceptually illustrates a communication network and an associated network administration GUI tool according to one embodiment of the present invention.

Apparatus and methods are described for initializing, allocating and de-allocating reservation protocol sessions between a plurality of network devices in a communication network. Broadly stated, embodiments of the present invention seek to provide a graphical user interface (GUI) that facilitates communication network administrative tasks, such as allocating and de-allocating bandwidth and establishing reservation protocol sessions between network devices. This is accomplished by allowing the network administrator to analyze various repercussions of increasing/decreasing demand over various paths through a communication network and viewing the bandwidth effects at all nodes on the path for a schedule that may vary based on usage deviations at various times of the day, week, month or year.

As discussed further below, a media aggregation manager is initialized with an expected bandwidth utilization between it and another media aggregation manager. Two media aggregation managers, having pre-allocated a reservation protocol session to accommodate an expected bandwidth usage between them allow a group of terminals associated with a network to utilize a portion of the pre-allocated reservation protocol session without having to establish individual reservation protocol sessions for each application session as previously required by conventional networks. In a VoIP environment, pre-allocation of such a reservation protocol session between media aggregation managers saves time in establishing application sessions among terminals associated with the media aggregation managers and saves computational resources and overhead by not requiring each VoIP connection to establish and maintain its own individual reservation protocol session.

One benefit of the graphical user interface according to an embodiment of the present invention is that it allows a system administrator to adjust bandwidth allocation requirements for a plurality of users communicating between a plurality of locations based on historical and current utilization demands by allowing allocation and de-allocation of bandwidth reservations between a plurality of media aggregation managers. Another advantage of various embodiments of the present invention is that the GUI allows a user, by selecting a path, to initialize multiple routers along the path without requiring the user to individually provision each router. Embodiments of the present invention address the inadequacy of current network management tools by providing a GUI for discovering a VoIP network, including the media aggregation managers residing on the VoIP network and allowing a user, based on predicted usage requirements, to initialize the media aggregation managers and the routers included on a selected path for a predetermined schedule.

According to one embodiment, a VoIP network containing a plurality of media aggregation managers is discovered and then displayed. The user may review individual properties for each of the nodes displayed on a network map. For example, the user may select two media aggregation managers for inter-communication analysis along with a predicted community demand of resources between the two selected media aggregation managers. The GUI displays a prioritized list of potential paths between the selected media aggregation managers including one or more routers for the communities to use in communicating between the media aggregation managers. Additionally, the user may select a path for an analysis of the effect of allocating the predicted bandwidth to a reservation protocol session between the selected media aggregation managers. The graphical user interface displays a predicted schedule of bandwidth traffic for any node on the network incorporating the predicted pre-allocated bandwidth that is being considered for allocation between the media aggregation managers. Based on the displayed data, the user may decide to allocate the bandwidth for all of the routers and media aggregation managers along the selected path, change paths, de-allocate bandwidth between these or other media aggregation managers or reduce/restrict the predicted community usage on a selected path.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general purpose or special purpose processor programmed with the instructions to perform the steps. Alternatively, the steps may be performed by a combination of hardware and software.

Embodiments of the present invention may be provided as a computer program product that may include a machine-readable medium having stored thereon instructions that may be used to program a computer (or other electronic devices) to perform a process. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to particular existing signaling, control, and communications protocol standards, such as International Telecommunication Union Telecommunication Standardization Section (ITU-T) Recommendation H.225.0 entitled "Call Signaling Protocols and Media Stream Packetization for Packet-based Multimedia Communication Systems," published February 1998 (hereinafter H.225.0); ITU-T Recommendation H.245 entitled "Control Protocol for Multimedia Communication," published May 1999 (hereinafter H.245); ITU-T Recommendation H.323 entitled "Packet-based Multimedia Communications Systems," published September 1999 (hereinafter H.323); and a particular bandwidth reservation protocol (i.e., RSVP), the present invention is equally applicable to various other signaling, control, communications and reservation protocols. For example, Session Initiation Protocol (SIP) may be employed to create, modify, and terminate application sessions with one or more participants. SIP is described in M. Handley et al., "SIP: Session Initiation Protocol," RFC 2543, Network Working Group, March 1999, which is hereby incorporated by reference.

In addition, for sake of brevity, embodiments of the present invention are described with reference to a specific application (i.e., VoIP) in which individual flows may be multiplexed over a pre-allocated bandwidth reservation protocol session. Nevertheless, the present invention is equally applicable to various other applications that require real-time performance, such as applications based on human interactions (e.g., collaborative software, online/Web collaboration, voice conferencing, and video conferencing), and the like.

Terminology

Brief definitions of terms used throughout this application are given below.

A "media aggregation manager" may generally be thought of as a network device, such as an edge device at the ingress/egress of a user community, or a group of one or more software processes running on a network device that provides application/protocol specific multiplexing/de-multiplexing of media traffic onto a pre-allocated reservation protocol session.

A "reservation protocol" generally refers to a protocol that may be employed to communicate information regarding a desired level of service for a particular application flow. An example of an existing bandwidth reservation protocol is RSVP.

A "community" generally refers to a group of residents on a common network at a given location. For example, employees on an enterprise network at a given location or users of a particular Internet service provider (ISP) at a given location may represent a community.

A "reservation protocol session" generally refers to a set of reserved network resources, including the routers utilized for the session, established and maintained between two or more network devices that serve as proxies or gate-keepers for application endpoints residing behind the proxies. An example of a reservation protocol session is an RSVP session between two media aggregation managers.

"Total available bandwidth" refers to the amount of bandwidth accessible for any given router or could refer to the maximum available bandwidth of the most limiting node on a path between two selected nodes and their intervening nodes.

The "available communication bandwidth" encompasses the amount of bandwidth accessible for the desired type of communication to be reserved in any reservation protocol session. For instance, in one embodiment, the user may wish to allocate reservation protocol sessions for VoIP communication. In one case, 75% of the total available bandwidth may be the available communication bandwidth for VoIP type communications and a reservation protocol session initialized for 100 users between two media aggregation managers may only require 10% of the available communication bandwidth.

An "application session" generally refers to a session established and maintained between two or more terminals. According to embodiments of the present invention, one or more application sessions may be multiplexed onto a single reservation protocol session thereby reducing the overhead for establishing and maintaining multiple application sessions.

A "terminal" generally refers to a LAN-based endpoint for media transmission, such as voice transmission. Terminals may be capable of executing one or more networked applications programs. An example of a terminal would be a computer system running an Internet telephony application, such as CoolTalk or NetMeeting.

An "application" or "endpoint" generally refers to a software program that is designed to assist in the performance of a specific task, such as Internet telephony, online collaboration, or video conferencing.

Media Aggregation Manager Overview

FIG. 1 conceptually illustrates interactions between two media aggregation managers 130 and 140 according to one embodiment of the present invention. The media aggregation managers 130 and 140 act as reservation protocol proxies on behalf of the communities 150 and 160 where a plurality of residents wish to communicate with each other. For example, resident 151 may wish to communicate with resident 161 while resident 152 wishes to communicate with resident 162. According to one embodiment, the media aggregation managers 130 and 140 pre-allocate bandwidth and establish a reservation protocol session capable of handling multiple communications between residents in community 150 and residents in community 160. Having media aggregation managers controlling a single reservation protocol session for multiple communication for residents between a plurality of communities allows for packets of communication data to be efficiently multiplexed onto the single reservation protocol session, thereby reducing protocol overhead as individual pairs of residents need not set up and maintain their own reservation protocol sessions.

Reservation protocol sessions may apply to various paths. For example, the bandwidth reservation may relate to path 110 containing one intermediary router 111 or may be associated with path 120 containing two intermediary routers 121 and 122. The reservation protocol session for communications between community 150 and community 160 may also be split over the various paths 110 and 120 depending on the historical and current bandwidth burden on individual routers 111, 121 and 122. The media aggregation managers establish and maintain a reservation protocol session and then multiplex media packets associated with a plurality of application sessions between the communities 150 and 160. As prior technologies required each pair of terminals desiring real-time performance to establish and maintain an individual reservation protocol session, media aggregation managers and the apparatuses and methods for initializing/controlling the media aggregation managers have been developed to greatly reduce overhead and associated computational resources required by the network to provide real-time response for multiple application flows. Embodiments of the present invention provide a graphical user interface 100 that enables a user to interactively discover, analyze and initialize the media aggregation managers to handle a schedule of community communications.

An administration GUI tool 100 used for initializing the routers and media aggregation managers in accordance with one embodiment of the present invention is illustrated in FIG. 1. The instructions for the GUI may reside in any combination of hardware or software and likewise may reside on any system configured to interact with other nodes on the network.

Graphical User Interface Overview

FIG. 2 demonstrates one embodiment of a navigation tool for accessing various screens of the graphical user interface. In the embodiment depicted, a user, such as a system or network administrator, may choose from one of the listed options, for instance, the user may select Network Discovery 201 to discover the network to be initialized or may choose Bandwidth Allocation 203 to allocate bandwidth to or establish a reservation protocol session between selected media aggregation managers as will become apparent in the following description.

Figure 3:
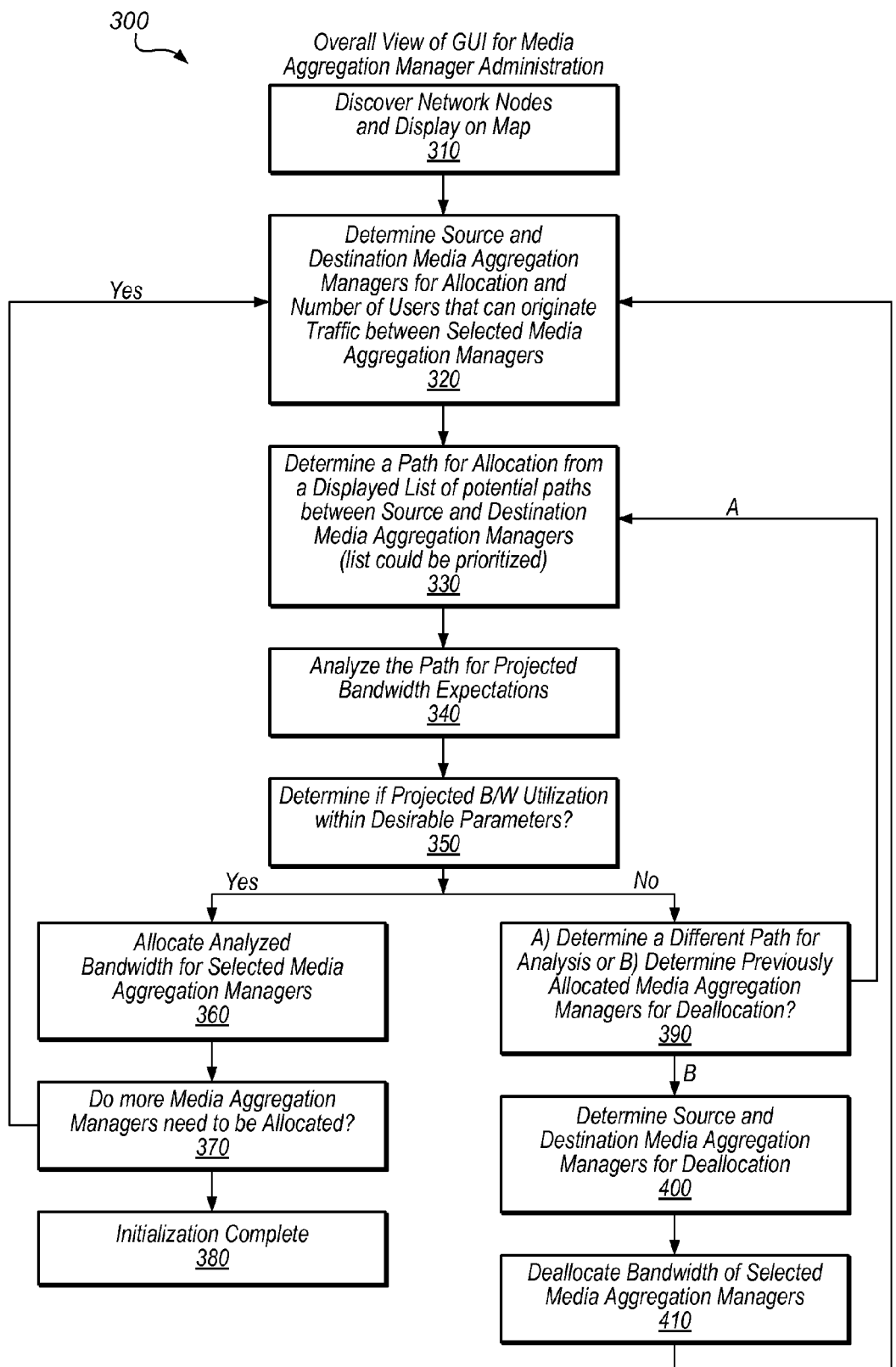
FIG. 3 is a flow diagram illustrating an initialization process according to one embodiment of the present invention.

FIG. 3 is a flow diagram illustrating an initialization process according to one embodiment of the present invention. Beginning with the menu depicted in FIG. 2, a user may navigate through the menu to administer to a network by first selecting Network Discovery 201 in processing block 310. Once the network discovery of block 310 is complete, the user may select to display the network map by selecting Network Map 202 from the menu. Alternatively, the network map may be automatically displayed after the network discovery processing of block 310 is complete. In any event, the network map displays all or a subset of the communities or locations that may participate in real-time communications via the network as well as various intermediate nodes and media aggregation managers.

After viewing the network map, the user may choose to go directly to the Bandwidth Allocation screen 203 by selecting the menu link or may choose to right-click on a graphical representation of one of the media aggregation managers and select from a pop-up menu to allocate bandwidth for that particular media aggregation manager. In either case, a Bandwidth Allocation screen is presented to the user enabling him or her to select a pair of media aggregation managers and indicate the number of users capable of communicating via the selected media aggregation managers 330. Once the user indicates which media aggregation managers are to be allocated and how many users are expected/predicted to utilize the reservation protocol session being initialized, one or more potential paths through the communication network coupling the two media aggregation managers are displayed on the bandwidth allocation interface. The user may select one of the potential paths for analysis and, through the graphical user interface, indicate that the selected path is to be analyzed.

At processing block 340, the selected path is analyzed to determine projected bandwidth utilization for each link of the selected path. Once analyzed, the administrator may select BW on Link 206 from the menu or the BW on Link screen may automatically appear after analysis has completed.

On the BW on Link screen, the user may select a node within the network to view a schedule of usage. Specifically of interest to an administrator, would be those nodes affected by the predicted increase in usage. Responsive to the node selection, a GUI screen displays a schedule of usage for the selected node and optionally a projection indicating if the predicted usage increase is within an acceptable range 350. When the predicted usage is within an acceptable range, the media aggregation managers may be initialized.

In one embodiment, assuming all nodes fall within an acceptable range, the user may initiate configuration of the routers on the selected path and allocates the bandwidth for the selected media aggregation managers 360 by selecting Bandwidth Allocation 203 from the menu. The user can then decide if more media aggregation managers need to be allocated 370 (for instance, if a pre-existing plurality of communities or locations are experiencing an increase of residents, terminals or users in the near future). When no more media aggregation managers need to be initialized, then the initialization is complete 380. On the other hand, when more media aggregation managers need to be initialized, the user may return to the network map interface through the Network Map menu item 202 or may return directly to the Bandwidth Allocation Interface through the Bandwidth Allocation menu item 203 and repeat the media aggregation selection process just described.

Alternatively, if the BW on Link screen provides data indicating that the predicted bandwidth utilization for any portion of the schedule exceeds the limitations of the network, the administrator may choose to select a different path for analysis or select to de-allocate a previously allocated reservation protocol session between two other media aggregation managers 390. In either case, the user may return to the Bandwidth allocation screen to select a different path through the bandwidth allocation menu item 203 or the user may select a different combination of media aggregation managers to analyze or de-allocate.

According to one embodiment, in view of a predicted bandwidth utilization decrease associated with a particular reservation protocol session, the administrator may de-allocate bandwidth associated with the reservation protocol session, thereby making available more bandwidth for other reservation protocol sessions. For example, the administrator may select the media aggregation managers 400 and then click on the menu option Bandwidth Deallocation 204 which brings up a dialog box 420 and de-allocate screen 430, shown in FIG. 4, allowing the user to de-allocate all or some of the bandwidth associated with the current reservation protocol session between the selected media aggregation managers 410.

Network Map Interface

Figure 5:
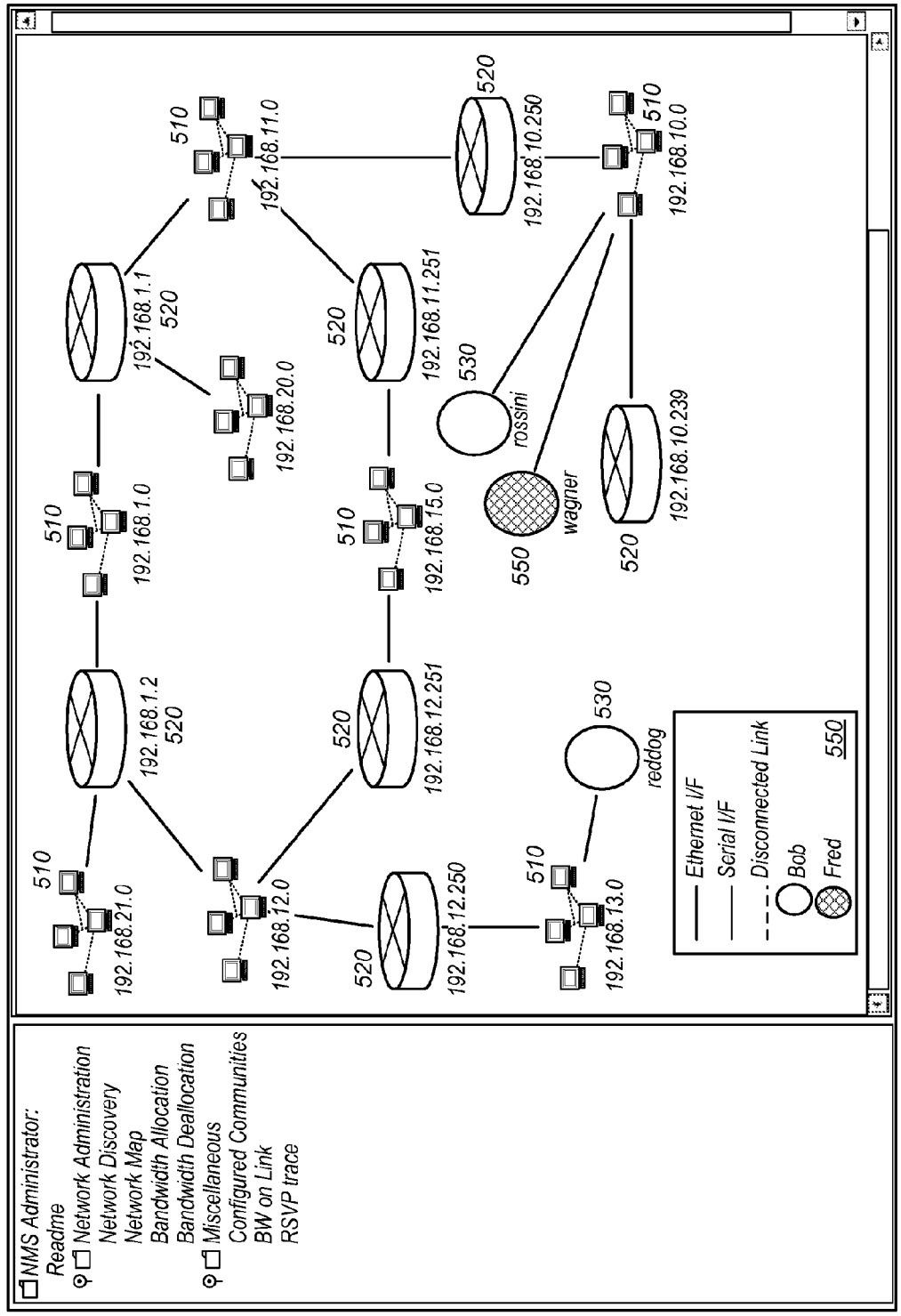
FIG. 5 illustrates a network map interface according to one embodiment of the present invention.

FIG. 5 illustrates a network map interface according to one embodiment of the present invention. A graphical representation of a plurality of discovered nodes on the network is shown. In addition, links between each of the nodes and the administration GUI 550 are shown. The network map screen indicates community nodes 510, router nodes 520 and media aggregation managers 530. In the present example, each of the nodes or media aggregation managers are visually distinguishable by being presented in a distinct graphical representation indicative of the type of node. In this manner, the administrator is able to readily identify whether a node is a community or location, router, media aggregation manager, etc. simply with reference to its graphical representation. The community nodes 510 may have a plurality of residents, including but not limited to computers, routers, phones, printers, scanners and the like. In one embodiment, each of the nodes and the media aggregation managers have associated properties that may be accessed by positioning the cursor over the graphical representation of the node of interest and clicking on a mouse button, such as the right mouse button, representing a property retrieval request.

Figure 6:
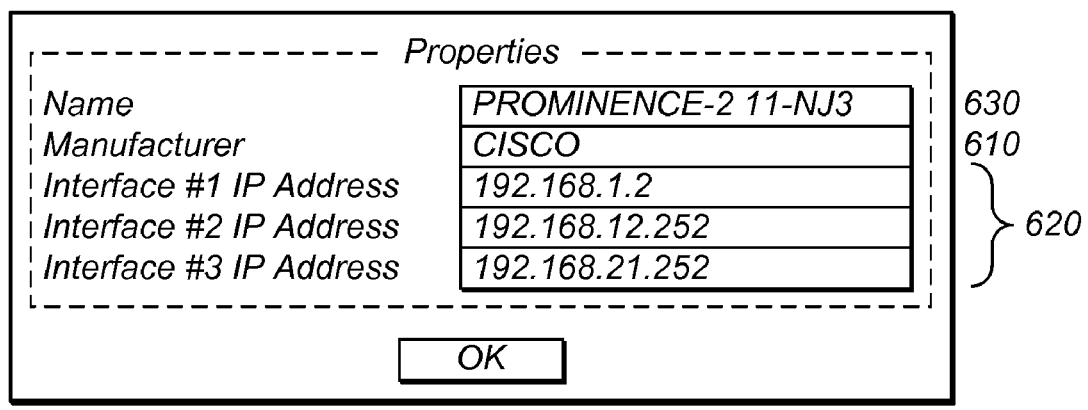
FIG. 6 illustrates a property window associated with a node according to one embodiment of the present invention.

FIG. 6 illustrates a property window associated with a node according to one embodiment of the present invention. In one embodiment, responsive to a property retrieval request associated with a particular node, a properties window is displayed indicating information about the selected node. For example, information such as the manufacturer 610, the interface addresses 620 or a name 630 may be displayed. Additionally, the properties window may indicate other information about the characteristics of the current configuration of the node. For instance, the property window for a media aggregation manager may indicate how many reservation protocol sessions it is maintaining and with which other media aggregation managers each of the reservation protocol sessions relate.

The property window may also indicate the available bandwidth for a given node and for what type of communication the bandwidth is available, such as voice or data communication and the amount of bandwidth that is currently allocated for reservation protocol sessions utilizing this particular media aggregation manager as a proxy or gate-keeper. Other functions available via the properties window may include interface command options, such as allocate bandwidth 540, de-allocate bandwidth (not shown), or other interface command options that take the user to various interface screens and option windows.

Figure 7:
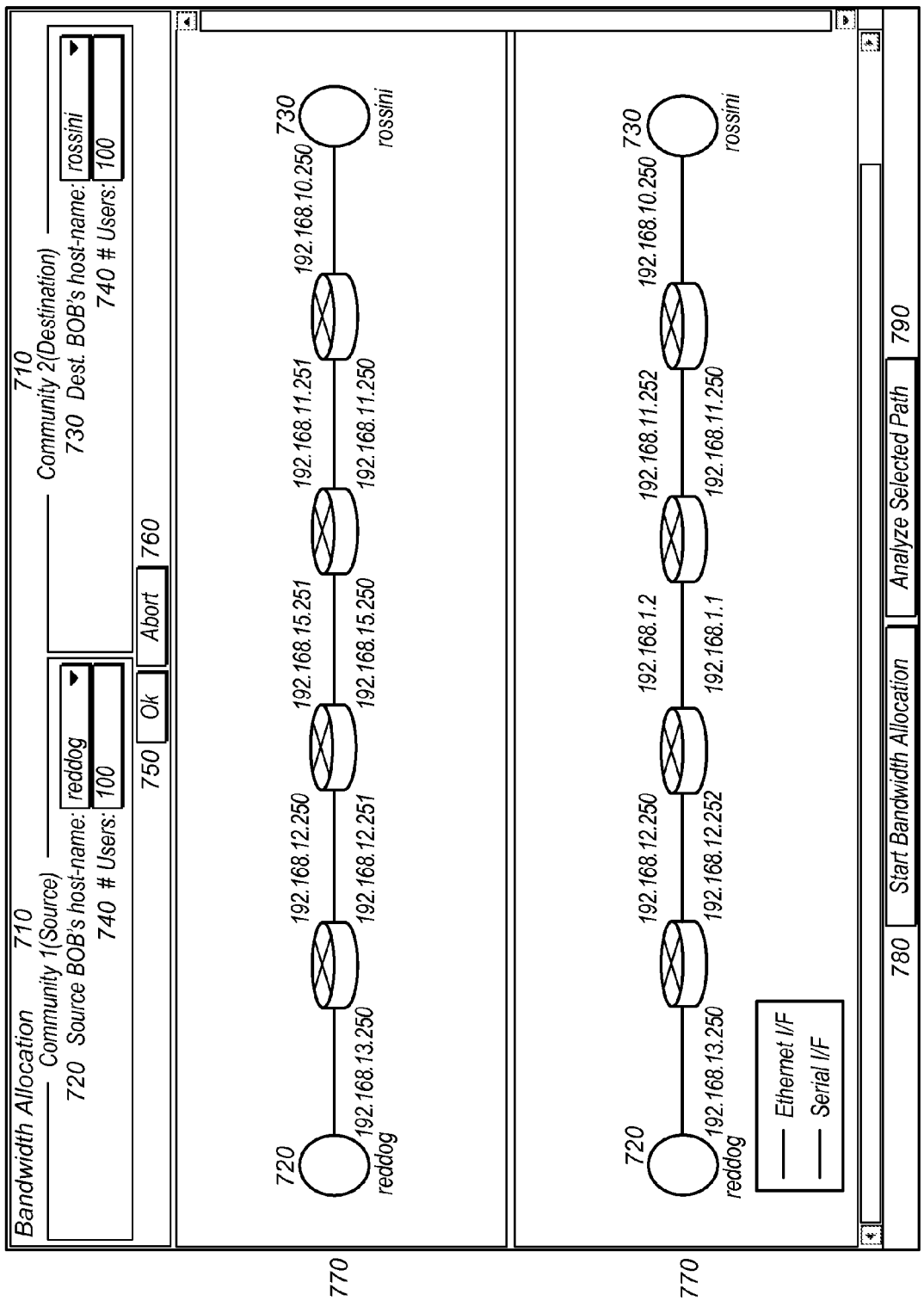
FIG. 7 illustrates a bandwidth allocation screen according to one embodiment of the present invention.

FIG. 7 illustrates a bandwidth allocation screen according to one embodiment of the present invention. In the example illustrated, the user may select two community gate-keepers or media aggregation managers 710 for analysis or initialization. In the present network configuration scenario, the administrator may select a source media aggregation manager 720, i.e., "reddog" from a menu listing all media aggregation managers that were discovered on the network (not shown) and a destination media aggregation manager 730, i.e., "rossini." The administrator may also designate the number of users 740 capable of communicating through each of the selected media aggregation managers. In this example, 100 users are capable of simultaneously communicating through the media aggregation manager reddog to residents whose gate-keeper or media aggregation manager is Rossini and likewise, 100 users are capable of communicating from Rossini to residents of reddog. Although the number of users for this example is 100 for both media aggregation managers, the number of users associated with the media aggregation managers involved in a particular reservation protocol session need not be the same.

Once the administrator has selected two media aggregation managers for analysis or initialization, the user may select "OK" 750 to request via the graphical user interface the initiation of processing algorithms to evaluate available paths between the two media aggregation managers. The administrator may also decide to "abort" the path evaluation process by selecting the "abort" button 760.

In the present example, although the present invention is not so limited, during the path evaluation process, two paths are identified connecting the media aggregation manager reddog to the media aggregation manager Rossini. In the present example, the graphical user interface then displays the paths graphically depicting intervening communities, routers or other nodes that lie between the selected media aggregation managers.

According to one embodiment, the graphical user interface may display the path list in a prioritized fashion utilizing factors such as the number of nodes between the media aggregation managers, the physical length of travel between nodes, the total available bandwidth on the nodes between the media aggregation managers, the available communication bandwidth, or the propagation speed between the various nodes that make up the path. For each factor or combination of weighted factors, the most limiting of the intervening nodes may be utilized for the computation as would be readily apparent to one skilled in the art.

The administrator may then select a path 770 to analyze. In most cases, the user may simply accept the highest prioritized path that in this case defaults to the first position on the graphical user interface but which may be configured otherwise. Alternatively, the administrator may perceive that a node in the highest prioritized path is going to ultimately be extremely burdened by other allocations that the administrator plans to initialize or has already initialized and instead may opt for a lower prioritized path. In either case, according to this example, once the administrator has selected a path for allocation or analysis, he/she then chooses to either establish the reservation protocol session between the two media aggregation managers by pressing the "start bandwidth Allocation" button 780 or chooses to analyze the effect the bandwidth allocation would have on the nodes by selecting "analyze selected path" button 790.

The bandwidth allocation screen allows the user to abort the analysis at any time if so desired by selecting the "abort" button 760.

Figure 9:
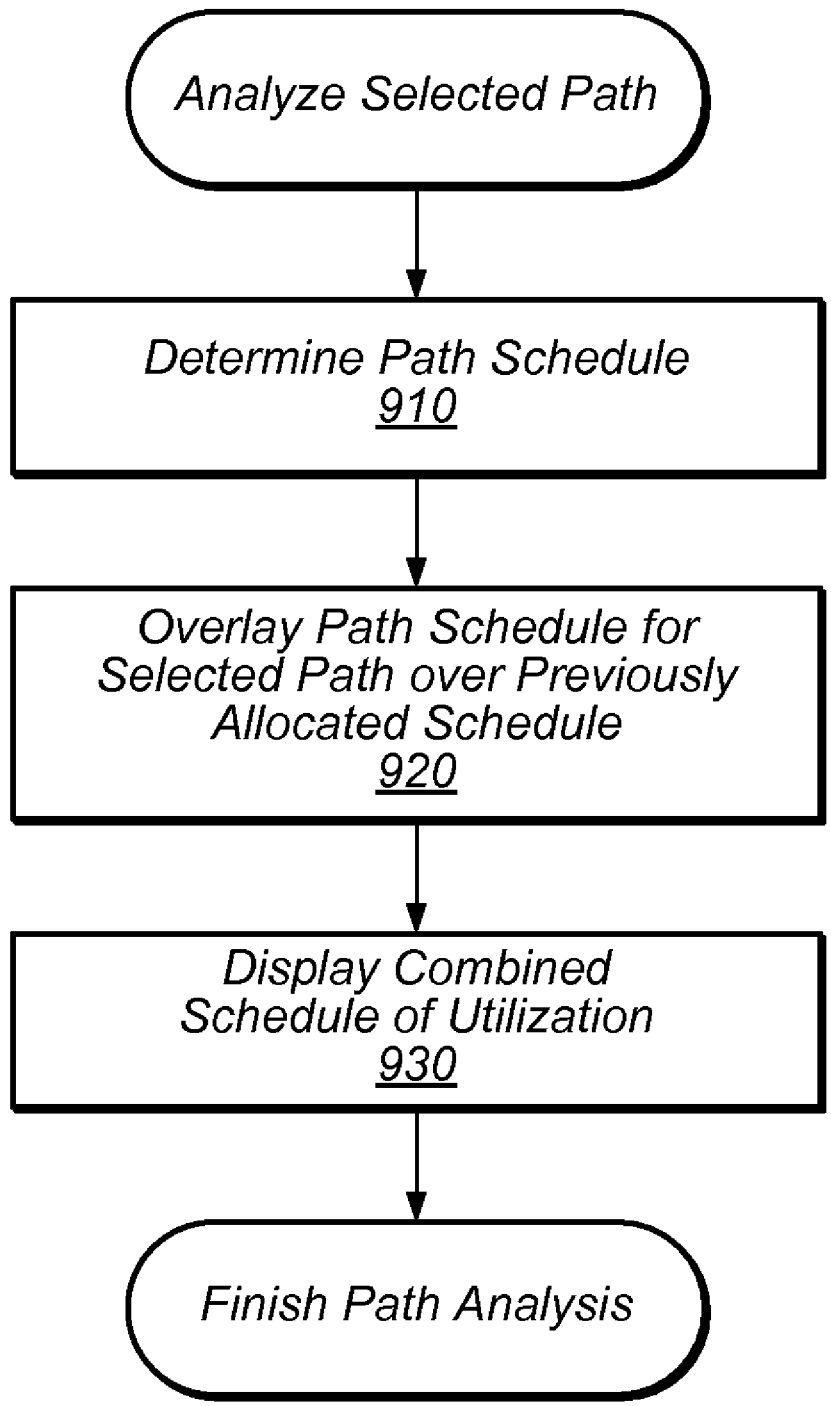
FIG. 9 is a flow chart depicting a process of analyzing a selected path according to one embodiment of the present invention.

FIG. 9 is a flow chart depicting a process of analyzing a selected path according to one embodiment of the present invention. In embodiments including the bandwidth allocation screen of FIG. 7, FIG. 9 demonstrates what happens when the analyze button 790 is selected. At block 910, a schedule of bandwidth allocation is determined for the selected path. At block 920, after the predicted schedule for the selected path has been determined, the schedule of increased bandwidth allocation is determined by overlaying the bandwidth requirements of the selected path on top of the bandwidth previously reserved on the nodes of the path. Finally, at block 930, the combined schedule of usage is optionally displayed to the administrator to allow the administrator to evaluate the impact of establishing a reservation protocol session over the selected path.

Figure 8:
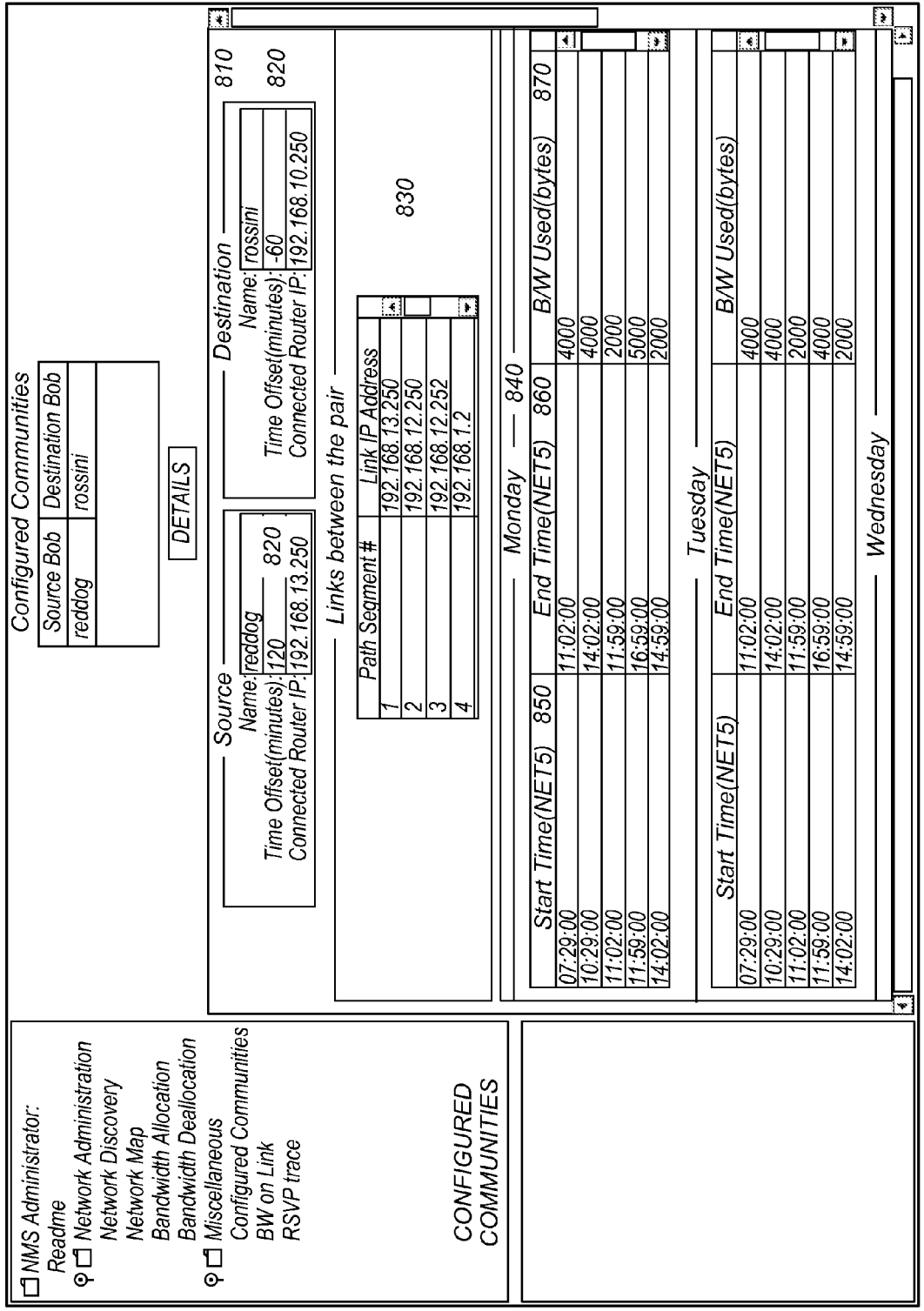
FIG. 8 illustrates a BW on Link screen showing a utilization schedule for a selected node on the discovered network according to one embodiment of the present invention.

Once the analysis of the selected path has completed, the graphical user interface may automatically switch to the BW on Link screen shown in FIG. 8 or the user may select BW on Link from the menu on the left and previously discussed with reference to FIG. 2. The BW on Link screen, in this embodiment, displays the predicted utilization, which would result from establishing a reservation protocol session on the selected path via the Bandwidth allocation interface. As previously indicated, the displayed schedule incorporates all previously allocated reservation protocol sessions and bandwidth reservations burdening the intervening nodes as well as the predicted increase as a result of the analyzed path if it were to be allocated. The results of the analysis may be viewed for each of the nodes displayed in the network map via the previously discussed property window. Typically of primary interest to an administrator would be the effect on the nodes along the selected path. The administrator may view the properties of one or more nodes on the selected path to determine whether establishment of the contemplated reservation protocol session will exceed the available communication bandwidth for any node at any time in the predicted schedule.

The media aggregation managers that have been analyzed are displayed 810. The administrator may indicate a time range for display by changing the offset for each router 820. In the present example, another segment of the display 830 includes a scrollable list of intervening nodes between the selected media aggregation managers. According to one embodiment, the administrator may select a node on the path to view a projected utilization schedule 840 for that node. In the present example, the projected utilization schedule depicts a time frame, including a Start Time 850 and End time 860, and indicates the bandwidth utilized during that time frame 870 and the amount of the available communication bandwidth 880 that would remain available assuming the analyzed path were to be allocated. The projected utilization schedule may cover various segments of the day as determined by the offsets selected 820 and also indicates a schedule of usage for the node for various days of the week. Once the administrator verifies that the utilization on all of the nodes of the selected path are within a desirable range, the administrator may select to return to the bandwidth allocation screen shown in FIG. 7 and allocate the bandwidth 780. Responsive to the allocate bandwidth button 780 being selected, the media aggregation managers are initialized and the specified bandwidth for the media aggregation managers is allocated.

Figure 10:
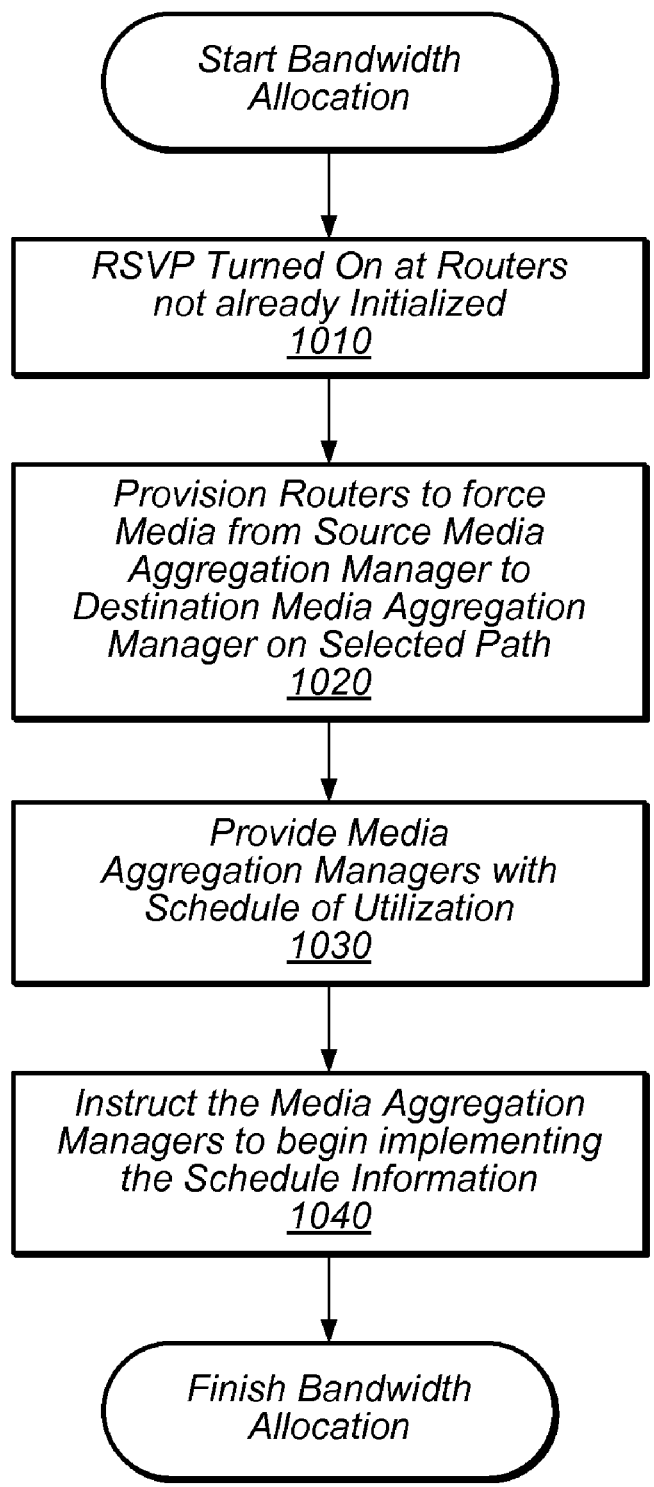
FIG. 10 is a flow chart depicting a process of initializing the selected media aggregation managers according to one embodiment of the present invention.

FIG. 10 is a flow chart depicting a process of initializing the selected media aggregation managers according to one embodiment of the present invention. In this example, at block 1010, RSVP is enabled for each and every router on the selected path where RSVP is not currently utilized. In block 1020, each router on the selected path is provisioned to force all media packets exchanged between the residents of the selected source and destination media aggregation managers through the selected path and the media aggregation managers. In block 1030, the media aggregation managers are initialized with scheduling information to enable the media aggregation managers to initialize and maintain appropriate reservation protocol sessions for the plurality of residents in accordance with the schedule. The reservation protocol sessions may be used to manage bandwidth reservations for multiple communication sessions in order to reduce the overhead and delay times associated with establishing individual reservation protocol sessions for each desired communication session as required by previous technologies. The scheduling information may include information such as how much bandwidth needs to be allocated for each session, expected increases and decreases in utilization based on time and other information necessary to manage a reservation protocol session.

In block 1040, the media aggregation managers begin establishing reservation protocol sessions according to the information schedule provided in block 1030.

Figure 4:
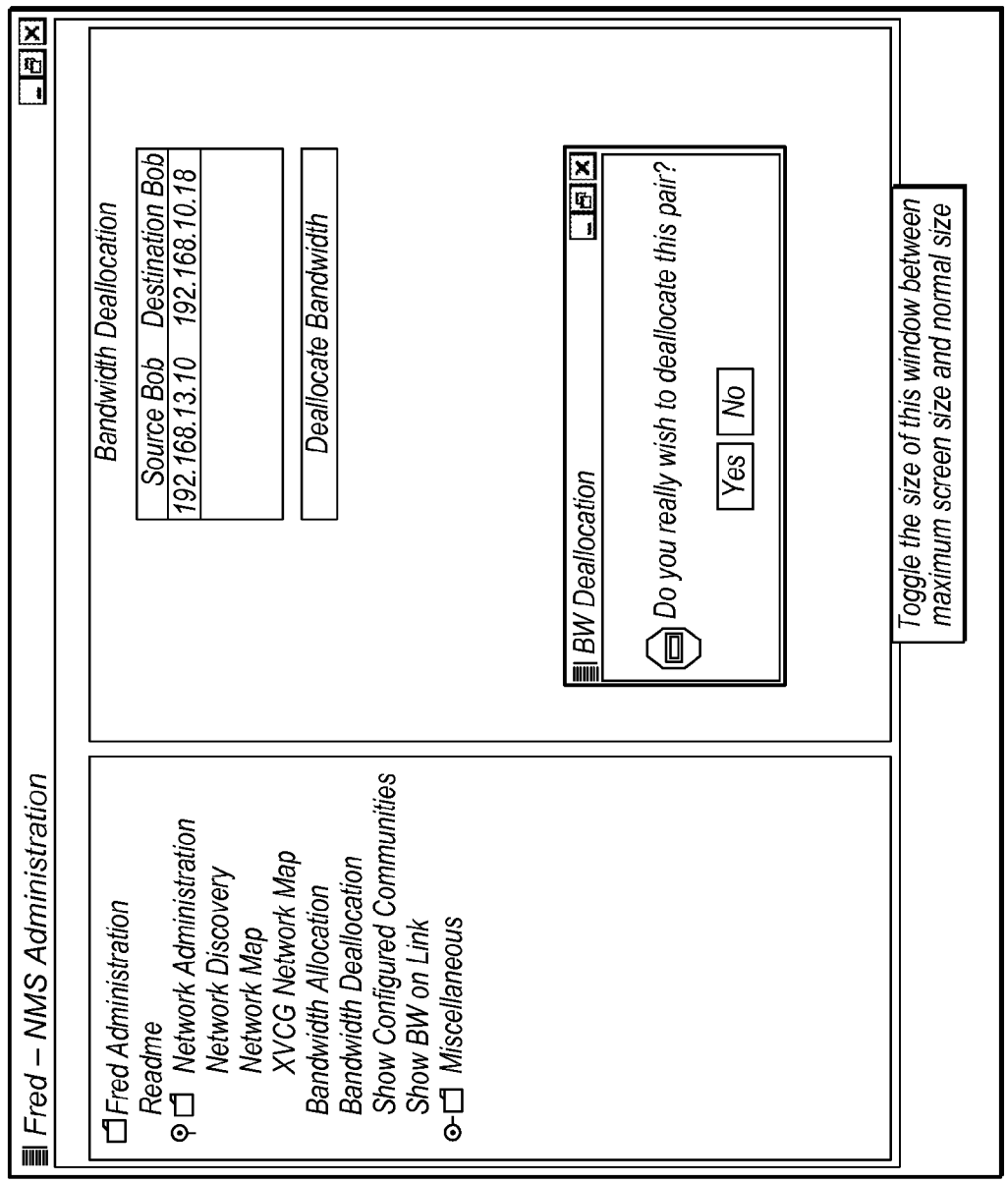
FIG. 4 is a screen used for de-allocation of the media aggregation managers according to one embodiment of the present invention.

In some instances, for example where the schedule indicates that utilization will exceed the available communication bandwidth, the administrator may select another path for analysis, select another pair of allocated media aggregation nodes for de-allocation or restrict the number of users allowed to communicate over the selected media aggregation managers. Should the administrator decide to de-allocate a previously allocated reservation protocol session, he/she selects the media aggregation managers and then selects Bandwidth Deallocation 204 from the menu. FIG. 4 illustrates an exemplary bandwidth deallocation screen that allows an administrator to select "deallocate bandwidth". In response, the graphical user interface provides a warning and confirmation dialog box. The administrator may proceed with the deallocation request by confirming the deallocation.

Media Aggregation Overview

The architecture described herein seeks to resolve scalability problems observed in current reservation protocols. These scalability issues have slowed the adoption of reservation protocols in network environments where multiple applications must be provided with certainty regarding a minimum reserved bandwidth.

Figure 11:
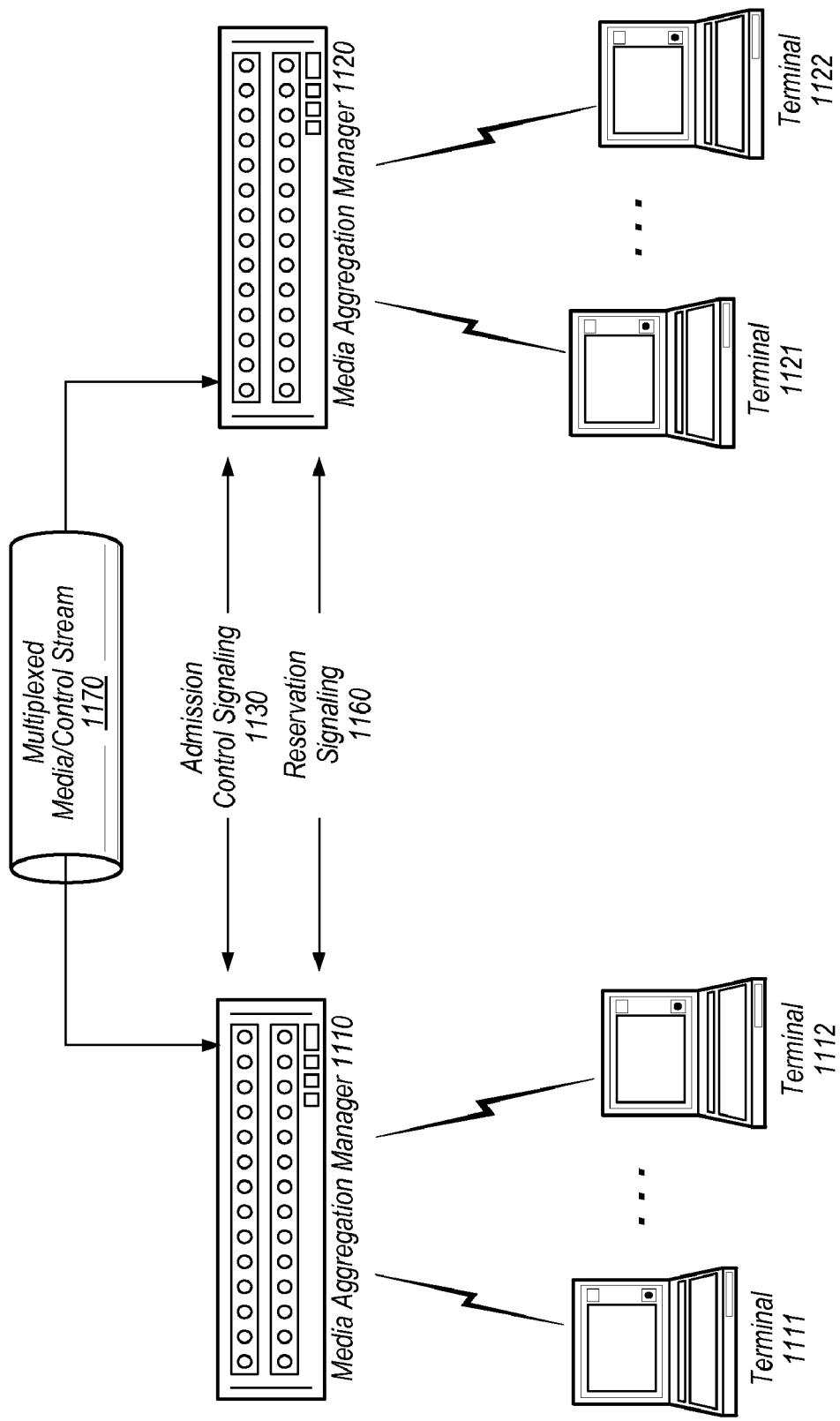
FIG. 11 conceptually illustrates interactions between two media aggregation managers according to one embodiment of the present invention.

FIG. 11 conceptually illustrates interactions between two media aggregation managers 1110 and 1120 according to one embodiment of the present invention. According to one embodiment, the media aggregation managers 1110 and 1120 act as reservation protocol proxies on behalf of the terminals 1111, 1112, 1121, and 1122. For example, the media aggregation managers 1110 and 1120 establish and maintain a reservation session, such as an RSVP session, between each other by exchanging reservation signaling messages 1160. Subsequently, rather than establishing additional reservation protocol sessions, the media aggregation managers 1110 and 1120 respond to reservation requests from the terminals 1111, 1112, 1121, and 1122 by dynamically allocating the reserved resources, such as bandwidth, associated with the reservation protocol session to corresponding application sessions. In this manner, multiple application sessions may share the reservation session by multiplexing media packets onto the reservation session as described further below.

In this example, a multiplexed media/control stream 1170 is established using admission control signaling messages 1130. The multiplexed media/control stream 1170 is carried over the pre-allocated reservation session between media aggregation manager 1110 and media aggregation manager 1120. The multiplexed media/control stream 1170 represents one way to handle certain transport and control protocol combinations, such as RTP and RTCP, that use different channels or ports for control and data. In alternative embodiments, the reservation protocol session 1160 may not need to distinguish between control and data.

While the media aggregation managers 1110 and 1120 may be discussed as if they are autonomous network edge devices, it should be kept in mind that according to various embodiments of the present invention some or all of the functionality of a media aggregation manager might be integrated with existing network devices, such as bridges, routers, switches, and the like. Additionally, while only a single aggregated reservation protocol session between two media aggregation managers 1110 and 1120 is described in connection with the present example, it should be appreciated that each media aggregation manager 1110 and 1120 may support multiple, heterogeneous reservation protocol sessions capable of providing heterogeneous application flows among multiple user communities. Importantly, according to embodiments of the present invention, regardless of the number of terminals or application/endpoints, application flows may be provided with reserved bandwidth between any and all pairs of terminals of N user communities by establishing and sharing no more than $N^2$ reservation protocol sessions.

Network Device Overview

Figure 12:
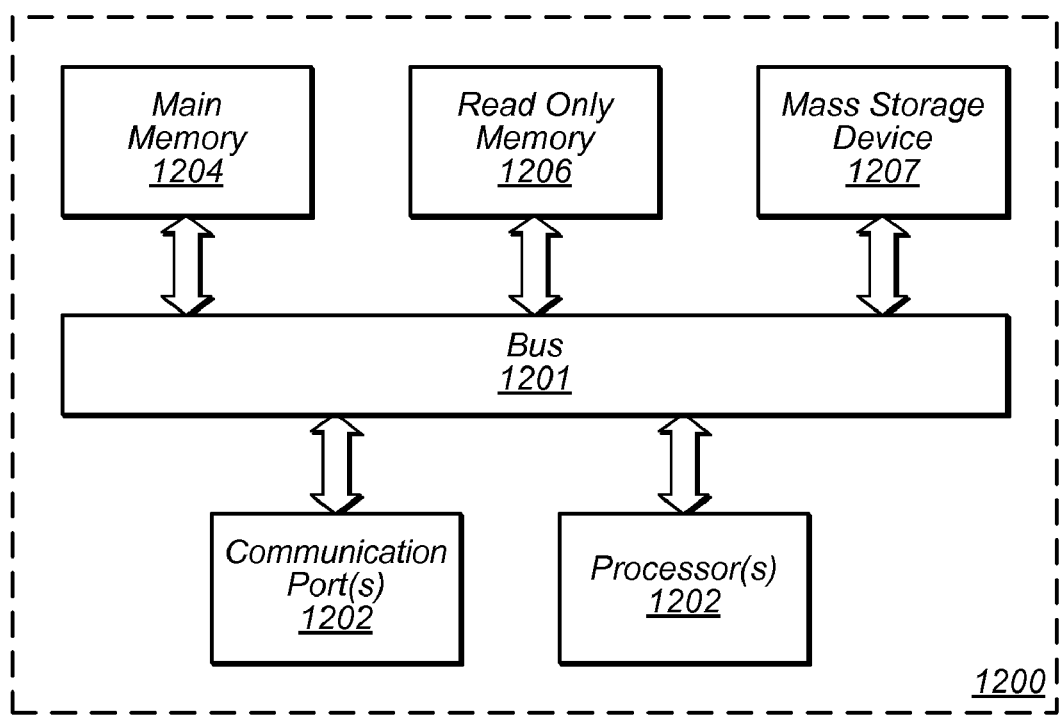
FIG. 12 is an example of a network device in which one embodiment of the present invention may be implemented.

An exemplary machine in the form of a network device 1200, representing an exemplary media aggregation manager 1110, in which features of the present invention may be implemented will now be described with reference to FIG. 12. In this simplified example, the network device 1200 comprises a bus or other communication means 1201 for communicating information, and a processing means such as one or more processors 1202 coupled with bus 1201 for processing information. Networking device 1200 further comprises a random access memory (RAM) or other dynamic storage device 1204 (referred to as main memory), coupled to bus

1201 for storing information and instructions to be executed by processor(s) 1202. Main memory 1204 also may be used for storing temporary variables or other intermediate information during execution of instructions by processor(s) 1202. Network device 1200 also comprises a read only memory (ROM) and/or other static storage device 1206 coupled to bus 1201 for storing static information and instructions for processor 1202. Optionally, a data storage device (not shown), such as a magnetic disk or optical disc and its corresponding drive, may also be coupled to bus 1201 for storing information and instructions.

One or more communication ports 1225 may also be coupled to bus 1201 for allowing various local terminals, remote terminals and/or other network devices to exchange information with the network device 1200 by way of a Local Area Network (LAN), Wide Area Network (WAN), Metropolitan Area Network (MAN), the Internet, or the public switched telephone network (PSTN), for example. The communication ports 1225 may include various combinations of well-known interfaces, such as one or more modems to provide dial up capability, one or more 10/100 Ethernet ports, one or more Gigabit Ethernet ports (fiber and/or copper), or other well-known interfaces, such as Asynchronous Transfer Mode (ATM) ports and other interfaces commonly used in existing LAN, WAN, MAN network environments. In any event, in this manner, the network device 1200 may be coupled to a number of other network devices, clients and/or servers via a conventional network infrastructure, such as a company's Intranet and/or the Internet, for example.

Media Aggregation Manager

Figure 13:
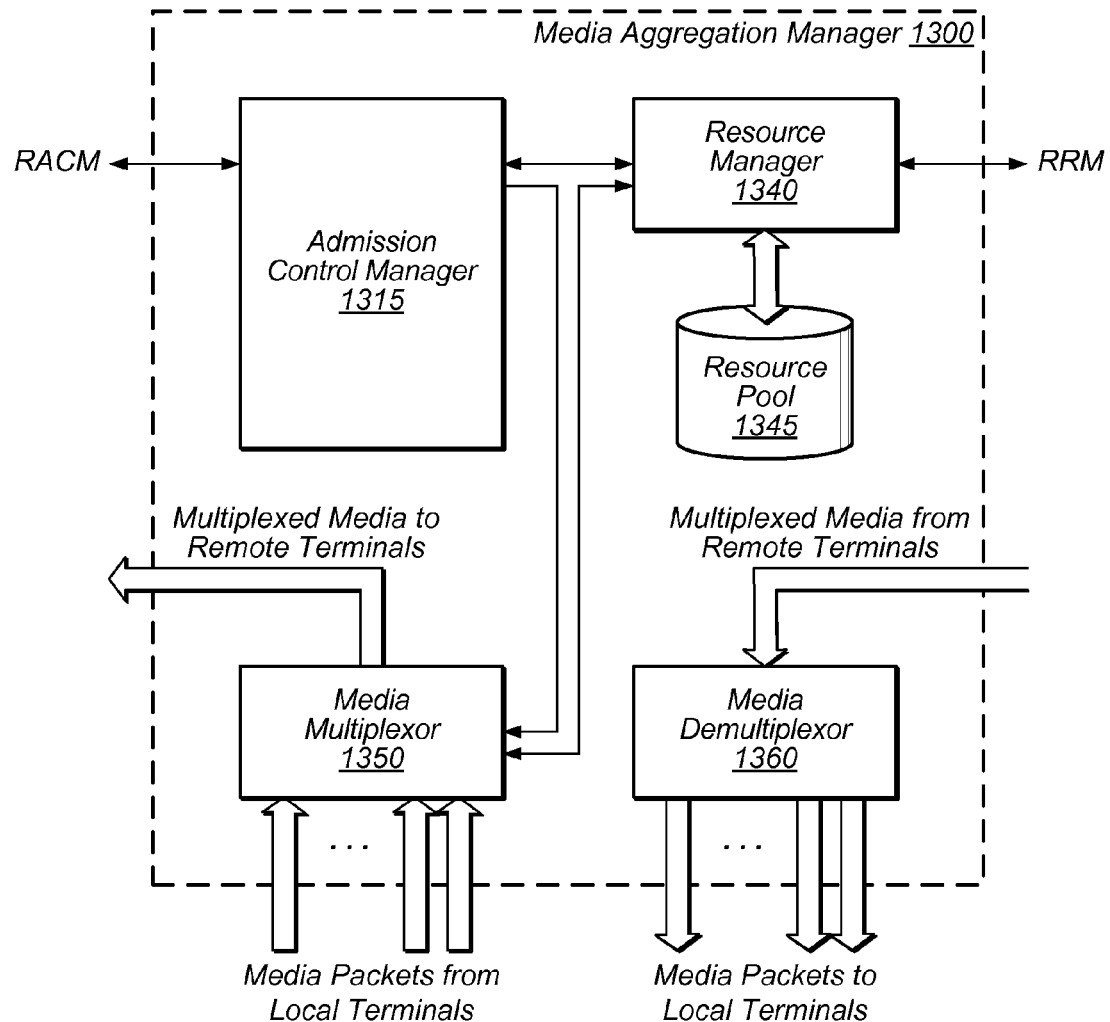
FIG. 13 is a high-level block diagram of a media aggregation manager according to one embodiment of the present invention.

FIG. 13 is a high-level block diagram of a media aggregation manager according to one embodiment of the present invention. By interconnecting a plurality of distributed media aggregation managers, such as media aggregation manger 1300, an architecture is provided for multiplexing several application flows (e.g., VoIP calls) over a pre-allocated reservation protocol session, such as a pre-allocated RSVP pipe. Advantageously, the multiplexing of application flows reduces the computational resources required by the network to provide reserved bandwidth, e.g., guaranteed bandwidth, for multiple application flows. The source media aggregation manager receives media packets from its local terminals and transmits multiplexed media to the destination aggregation manager. The destination aggregation manager receives the multiplexed media and routes media packets to the appropriate terminal(s) of its local terminals.

In this example, the media aggregation manger 1300 includes an application/protocol specific media multiplexor 1350, an application/protocol specific media demultiplexor 1360, an admission control manager 1315, a generic resource manager 1340, and a resource pool 1345. In a software implementation, instances of the media multiplexor 1350, media demultiplexor 1360, and admission control manager 1315 may be created for each particular application/protocol needed to allow communications between terminals of the geographically diverse user communities. Importantly, it should be appreciated that the particular partitioning of functionality described with reference to this example is merely illustrative of one or many possible allocations of functionality.

According to the embodiment depicted, the resource manager 1340 establishes and maintains one or more pre-allocated reservation protocol sessions between the local media aggregation manager and one or more remote media aggregation managers. The resource manager 1340 optionally interfaces with a centralized entity (not shown) that provides information relating to the characteristics and estimated amount of resources for the pre-allocated reservation protocol sessions. Alternatively, a network administrator may provide information to the resource manager 1340 relating to desired characteristics of the pre-allocated reservation protocol sessions. The resource manager 1340 also tracks active application sessions for each reservation protocol session and the current availability of resources for each reservation protocol session in the resource pool 1345.

The admission control manager 1315 interfaces with local terminals (not shown) associated with a particular user community, the media multiplexor 1350, the resource manager 1340, and one or more other remote media aggregation managers associated with other user communities. Importantly, in one embodiment, the media multiplexor 1350 hides the details of how reserved resources are internally allocated and managed, thereby allowing the local terminals to use existing reservation protocols, such as RSVP, without change. The media multiplexor 1350 receives media packets from the local terminals and appropriately translates/encapsulates the packets in accordance with the aggregation technique described further below. When application flows are established and terminated, the admission control manager 1315 interfaces with the resource manager 1340 to allocate and deallocate resources, respectively.

The media demultiplexor 1360 interfaces with the local terminals to supply with media packets by demultiplexing their respective application flows from the pre-allocated reservation protocol session.

The admission control manager 1315 exchanges admission control signaling messages with remote admission control managers and configures the local application/endpoint (LA) to send media to the media multiplexor 1350 after an application session has been established with a remote media aggregation manager. For VoIP using the H.323 protocol, the admission control manager 1315 may include RAS, call control, and call signaling processing.

In operation, two resource managers cooperate to establish a pre-allocated reservation protocol session between a local media aggregation manager (LMAM) and a remote media aggregation manager (RMAM). The resource managers make a reservation that is large enough to accommodate the anticipated load offered by applications that need to communicate over the reservation protocol session. Subsequently, a local media multiplexor (LMM) associated with the LMAM provides admission control for application flows between one or more terminals of the LMAM and the RMAM with the assistance of the local and remote admission control managers and the local and remote resource managers. If sufficient resources, such as bandwidth, are available over the pre-allocated reservation protocol session, then the local media multiplexor multiplexes the application flows over the pre-allocated reservation protocol session. On the receiving end, the remote media demultiplexor (RMD) demultiplexes the application flows and sends them to their intended destinations. The typical admission control manager 1315 will be a player in the path of the application protocol for setting up the connection between two or more application endpoints; hence, it may be instrumented to modify the path of the media packets to flow through the LMM and remote media multiplexor (RMM).

In brief, after an application session has been associated with the pre-allocated reservation protocol session, the application/endpoints may use a transport protocol and/or a control protocol, such as RTP and/or RTCP to exchange media packets between them. The media packets may carry various types of real-time data, such as voice, video, multi-media, or other data for human interactions or collaboration. Media packets from a data source are tagged by the local media multiplexor 1350 and sent over the reserved path to one or more media demultiplexors 1360 corresponding to the data destination. As illustrated below, the media demultiplexor 1360 strips the tag before the media packets are forwarded and uses the tag information to determine the eventual destination of the data packet.

From the perspective of the local terminals, they are establishing and using reservation protocol sessions for each application flow. However, in reality, the media aggregation manager 1300 shares the pre-allocated reservation protocol session among multiple application flows.

As will be described further below, a specific example of the use of this architecture is in connection with the use of the H.323 protocol for VoIP calls. Typically, an H.323 Gatekeeper is used by endpoints to help in address resolution, admission control etc. So, for the H.323 protocol, the gatekeeper is a convenient place for the media multiplexor 1350 to reside.

Note that in this description, in order to facilitate explanation, the media aggregation manager 1300 is generally discussed as if it is a single, independent network device or part of single network device. However, it is contemplated that the media aggregation manager 1300 may actually comprise multiple physical and/or logical devices connected in a distributed architecture; and the various functions performed may actually be distributed among multiple network devices. Additionally, in alternative embodiments, the functions performed by the media aggregation manager 1300 may be consolidated and/or distributed differently than as described. For example, any function can be implemented on any number of machines or on a single machine. Also, any process may be divided across multiple machines.

Sharing a Pre-Allocated Reservation Protocol Session

Figure 14:
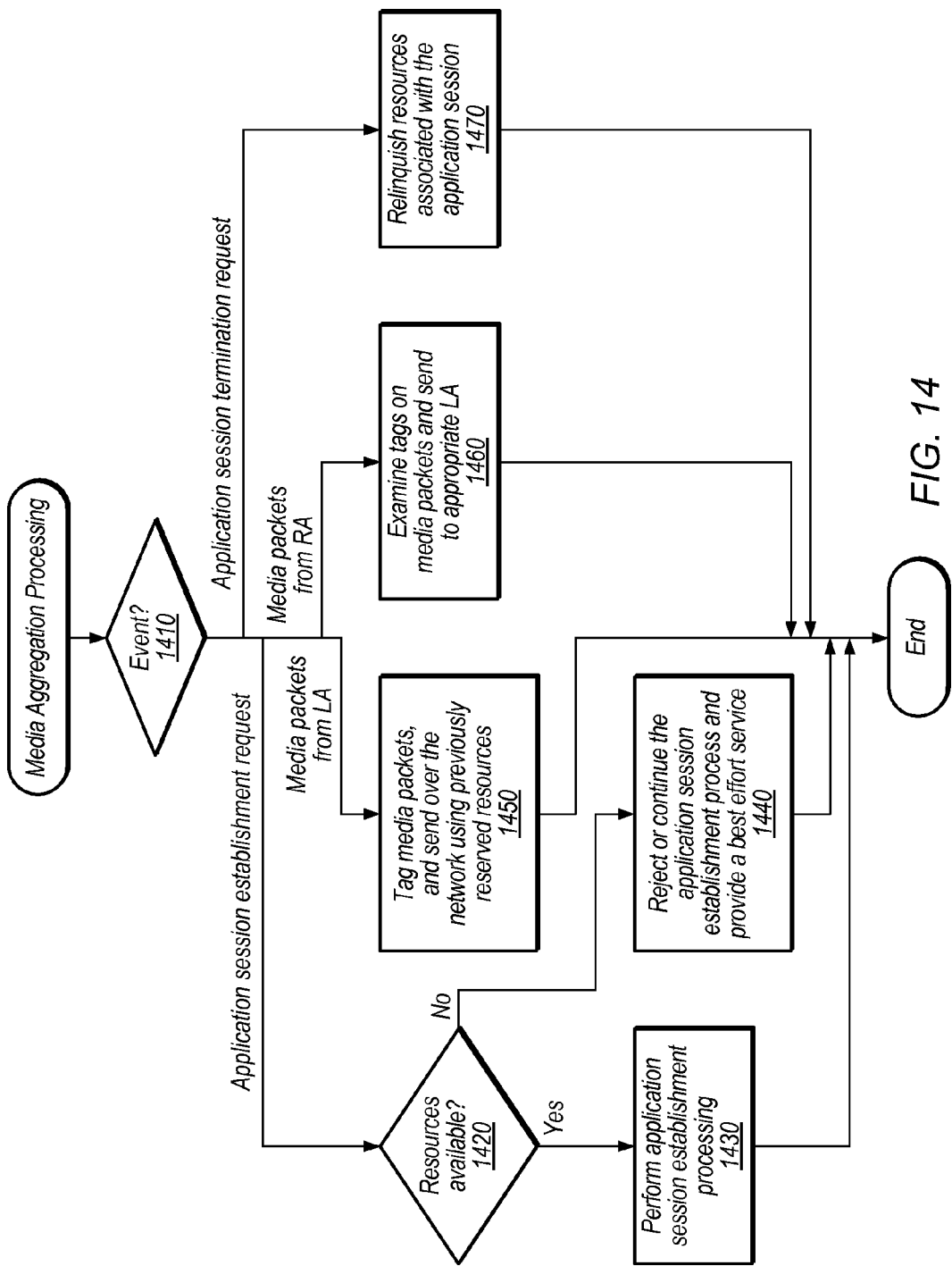
FIG. 14 is a simplified, high-level flow diagram illustrating media aggregation processing according to one embodiment of the present invention.

FIG. 14 is a simplified, high-level flow diagram illustrating media aggregation processing according to one embodiment of the present invention. In one embodiment, the processing blocks described below may be performed under the control of a programmed processor, such as processor 1202. However, in alternative embodiments, the processing blocks may be fully or partially implemented by any programmable or hard-coded logic, such as Field Programmable Gate Arrays (FPGAs), TTL logic, or Application Specific Integrated Circuits (ASICs), for example.

In this example, it is assumed that, prior to the start of the media aggregation processing, a reservation protocol session has been established. The pre-allocated reservation protocol session preferably takes into consideration current network resources and estimated usage of network resources, such as bandwidth, based upon historical data. For example, the amount of pre-allocated resources may vary due to different loads being offered at different times of day and/or day of week.

At any rate, at decision block 1410, the media aggregation manager 1300 determines the type of event that has occurred. If the event represents the receipt of an application session establishment request from a local terminal, then processing proceeds to decision block 1420. If the event represents the receipt of media packets from a local application/endpoint, then processing continues with decision block 1450. If the event represents the receipt of a media packet from a remote application/endpoint, then control passes to processing block 1460. If the event represents the receipt of an application session termination request, then processing continues with processing block 1470.

At decision block 1420, a determination is made whether resources are available to meet the needs identified in the application session establishment request. For example, the resource manager 1340 may determine if sufficient bandwidth is available on an appropriate pre-allocated reservation protocol session by comparing a minimum bandwidth specified in the application session establishment request to a bandwidth availability indication provided by the resource pool 1345.

If adequate resources are available to provide the requestor with the minimum resources requested, processing continues with processing block 1430 where application session establishment processing is performed. Application session establishment processing is described below with reference to FIG. 15. Otherwise, if there are insufficient resources to accommodate the application session establishment request, processing branches to processing block 1440. At processing block 1440, the media aggregation manager 1300 may reject the application session establishment request. Alternatively, the media aggregation manager 1300 may continue the application session establishment process and provide a best effort service for the request (without the use of pre-allocated resources).

At processing block 1450, media packets received from a local application/endpoint are tagged and sent over the network to the destination using the previously reserved resources (e.g., the pre-allocated reservation protocol session). The tagging and multiplexing of media packets onto the pre-allocated reservation protocol session will be discussed in detail below.

At processing block 1460, media packets received from a remote application/endpoint are forwarded to the appropriate local application/endpoint. For example, the packets may be sent to the appropriate local application/endpoint based upon an examination of the tag information added by the remote media aggregation manager.

At processing block 1470, in response to an application session termination request, resources allocated to this application session are relinquished and made available for other application sessions. For example, the resource manager 1340 may update an indication of available resources in the resource pool 1345 for the pre-allocated reservation protocol session associated with the terminated application session.

Figure 15:
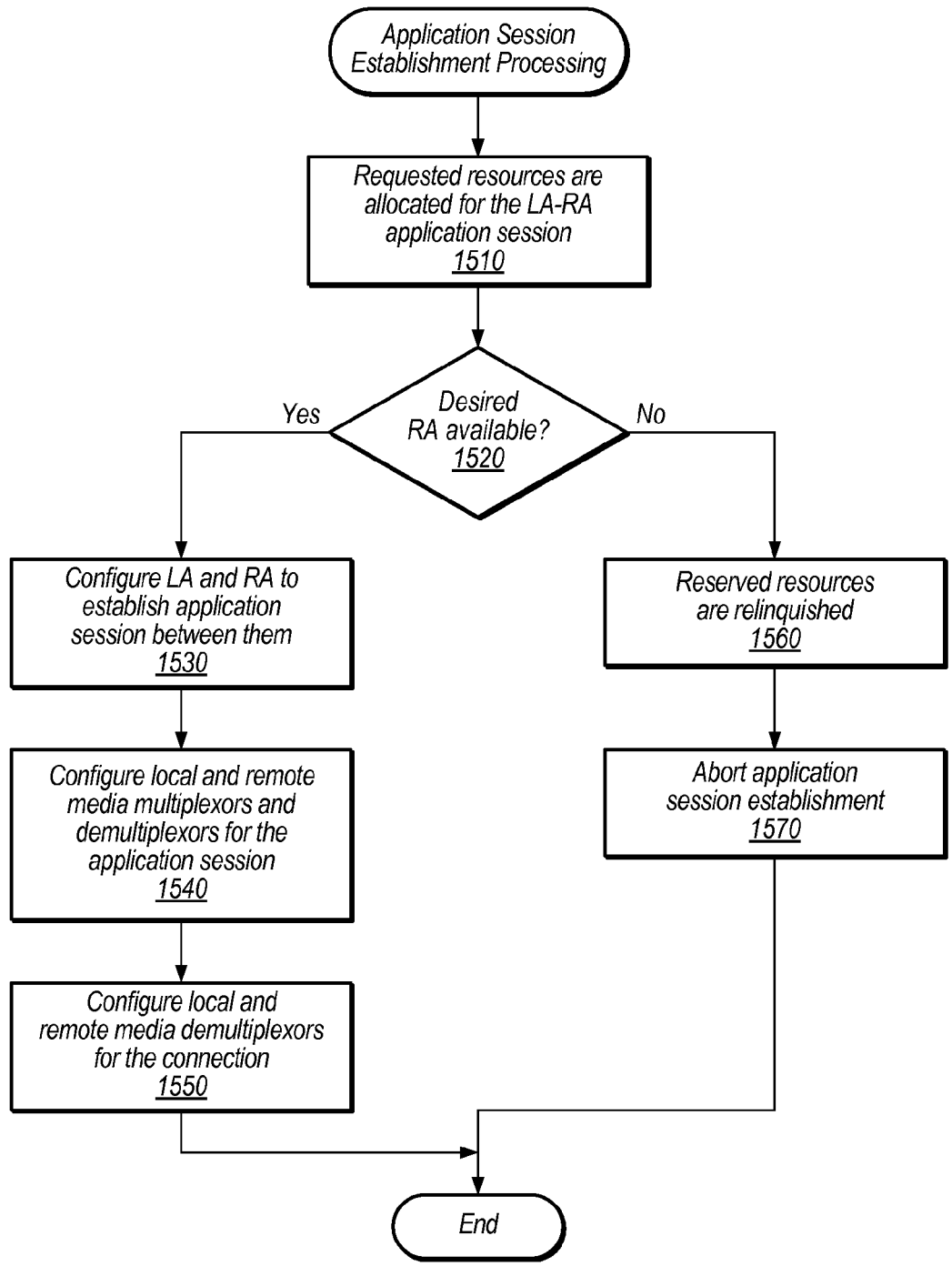
FIG. 15 is a simplified, high-level flow diagram illustrating application session establishment processing according to one embodiment of the present invention.

FIG. 15 is a simplified, high-level flow diagram illustrating application session establishment processing according to one embodiment of the present invention. In the present example, application session establishment processing begins with processing block 1510. At processing block 1510, the requested resources are allocated to the application session. According to one embodiment, the local resource manager 1340 creates a new application session entry, in the resource pool 1345, containing an indication of the resources granted to the application session.

At decision block 1520, a determination is made whether the desired remote application/endpoint is available to participate in the application session. If so, processing proceeds to processing block 1530; otherwise, processing branches to processing block 1560.

Assuming the desired remote application/endpoint is available to participate in the application session, then at processing block 1530, the local application/endpoint and the remote application/endpoint are configured to send media packets associated with the application session to the local and remote media multiplexors, respectively.

At processing blocks 1540 and 1550, the local and remote media multiplexors and demultiplexors are configured in accordance with the application session. For example, as described further below, a lookup table may be maintained by the media multiplexor 1350 or media demultiplexor 1360 to translate the source network address of the local application/endpoint to the destination network address of the remote application/endpoint.

Figure 16:
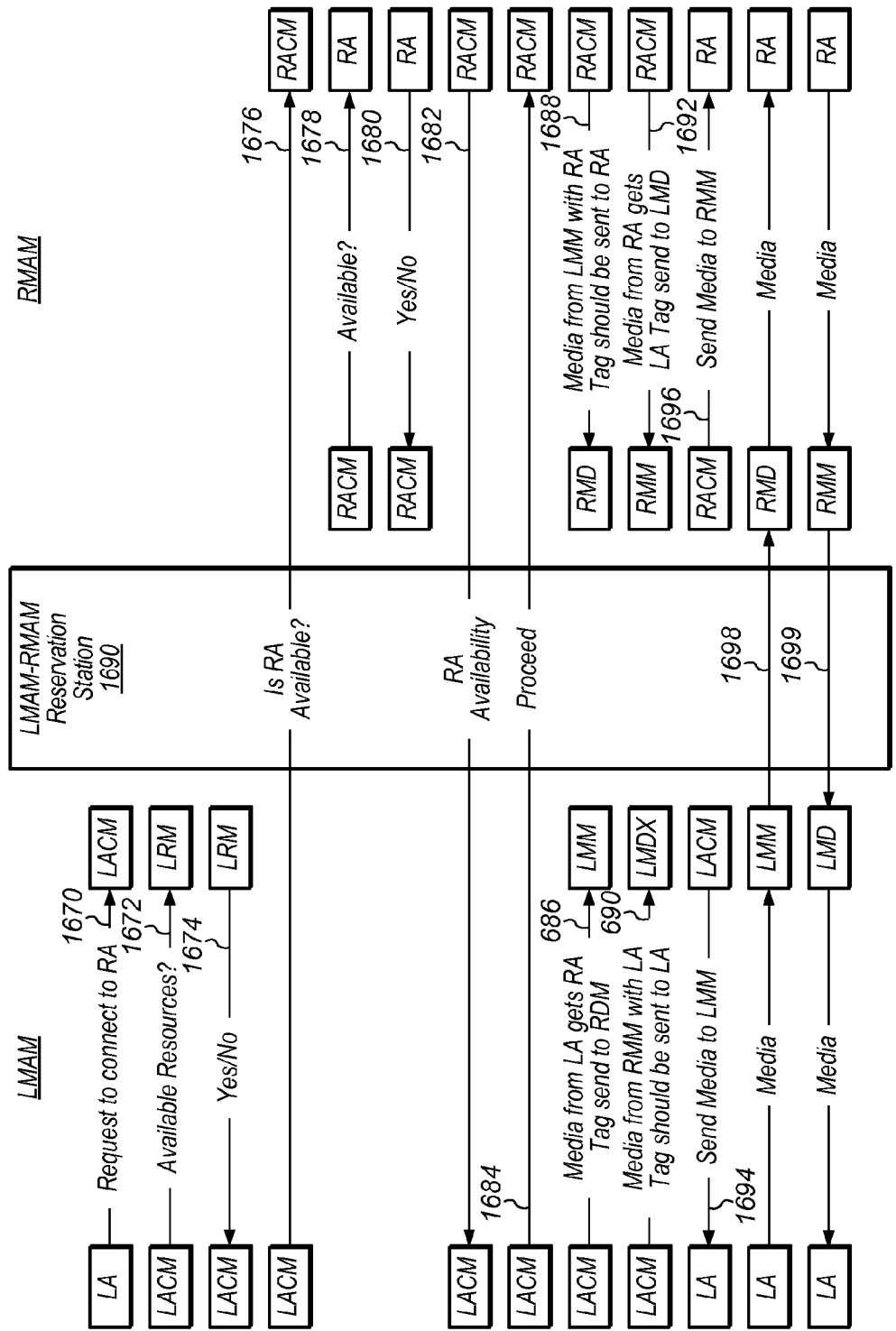
FIG. 16 illustrates interactions among local and remote media aggregation manager functional units according to one embodiment of the present invention.

FIG. 16 illustrates interactions among local and remote media aggregation manager functional units according to one embodiment of the present invention. In general, the media aggregation managers abstract the true application session endpoints from each other and serve as proxies for their respective local applications/endpoints. The media aggregation managers accomplish this by intercepting messages originating from their respective local applications/endpoints and modifying the messages to make themselves appear as the actual application flow originators/recipients.

In this example, for simplicity, it is assumed that a single local application/endpoint (LA) is establishing an application session with a single remote application/endpoint (RA) over a pre-allocated reservation protocol session 1690 between a local media aggregation manager (LMAM) geographically proximate to the LA and a remote media aggregation manager (RMAM) geographically proximate to the RA.

The LA transmits a request to connect to the RA to the LMAM (1670). The LACM inquires of the local resource manager (LRM) whether sufficient resources are currently available to accommodate the LA's request (1672). The LRM indicates the availability or inavailability of available resources to the LACM (1674).

Assuming, sufficient resources are available to provide the reserved resources the LA needs for the requested connection to the RA, then the LACM asks the RACM if the RA is available (1676). In response to the LACM's request, the RACM queries the RA to determine its present availability (1678). The RA indicates whether or not it is currently available to participate in an application session (1680).

Assuming, the RA indicates that it is available, then the RACM communicates the RA's availability to the LACM (1682). In response to the availability of the RA, the LACM directs the RACM to proceed with establishment of a connection between the LA and RA.

Having determined that a connection is feasible, the LACM and RACM proceed to configure their media multiplexors and media demultiplexors for the LA-RA connection. The LACM configures the local media multiplexor (LMM) to tag media originated from the LA for routing to the RA and to send the resulting encapsulated media packets to the remote media demultiplexor (RMD) (1686). The LACM further configures the local media demultiplexor (LMD) to forward media packets that are received from the RMM and tagged as being associated with the LA-RA connection to the LA (1690).

Similarly, the RACM configures the remote media demultiplexor (RMD) to forward media packets that are received from the LMM and tagged as being associated with the LA-RA connection to the RA (1688). The RACM also configures the remote media multiplexor (RMM) to tag media originated from the RA for routing to the LA and to send the resulting encapsulated media packets to the local media demultiplexor (LMD) (1692).

Once the media multiplexors and media demultiplexors have been appropriately configured for the LA-RA connection, the LACM and the RACM inform their application/endpoints to commence transmission of media to the LMM and the RMM, respectively. Thus, the media aggregation managers appear to their respective application/endpoints as the actual application flow originators/recipients and subsequently serve as proxies for their respective application/endpoints.

During media transmission between the LA and the RA 1698 and 1699, media packets originated by the LA are sent to the LMM, which encapsulates the media packets by appending a tag appropriate for the LA-RA connection and forwards the encapsulated packets over the pre-allocated reservation protocol session 1690 to the RMD. The RMD determines the RA is the intended destination based upon the tag, removes the tag, and forwards the media packet to the RA. Media packets originated by the RA are sent to the RMM, which encapsulates the media packets by appending a tag appropriate for the LA-RA connection and forwards the encapsulated packets over the pre-allocated reservation protocol session 1690 to the LMD. The LMD determines the LA is the intended destination based upon the tag, removes the tag, and forwards the media packet to the LA.

An Exemplary H.323 VoIP Implementation

H.323 is basically an umbrella that covers several existing protocols, including but not limited to H.225.0, and H.245. The later two protocols are used to establish call connection, and capability information between two endpoints. Once this information is exchanged, the endpoints may use RTP and RTCP to exchange voice (and multi-media) information between them.

H.323 suggests that RTP/RTCP should be established between two endpoints (caller/receiver) for each call. Consequently, in order to provide Quality Of Service (QoS) for each call using a protocol like RSVP would mean that every endpoint pair (caller/receiver) for every H.323 call would need to establish RSVP between one another. This would create a huge amount of overhead on the endpoint and adversely affect network resources as RSVP "soft states" must be maintained for the life of the call. This quickly becomes a tremendous scalability issue, since as number of simultaneous calls increase, so do the RSVP "soft state" maintenance messages between endpoints, and every router involved in the transmitting RTP/RTCP data stream.

The media aggregation manager 300 described herein seeks to provide a clean, and scalable solution for this problem, while providing the same QoS as if two individual endpoints had used a reservation protocol session, such as RSVP, between them. Briefly, according to the described H.323 VoIP embodiment, the H.323 endpoints (callers/receivers) need not have knowledge of how to establish and maintain RSVP sessions. Instead, the media aggregation managers establish one or more RSVP "pipes" between them that can accommodate several (expected) voice calls. These RSVP pipes are created as the media aggregation managers are started and the RSVP pipes are maintained between them. This immediately reduces the amount of RSVP state processing in the network. The RSVP pipes between media aggregation managers may be created based upon an educated estimate of the number of calls that are expected between user communities being managed by these media aggregation managers. Since RSVP by nature is established between a specific IP address/port pair and since the pipes are pre-created between media aggregation managers, all voice traffic (RTP/RTCP) originates and terminates between media aggregation managers at the media multiplexor 350 and the media demultiplexor 360, respectively.

In this manner, according to one embodiment, the "local" media aggregation manager appears to an H.323 voice application caller as its intended receiver. The H.323 endpoints make calls to the media multiplexors of the local media aggregation managers without realizing the local media aggregation managers are not really the final destination. The local media aggregation manager calls the remote media aggregation manager and passes the RTP/RTCP voice data to it. The remote media aggregation manager receives the voice data and sends it the "real" receiver while hiding all mutiplexing details from both the caller and the receiver. However, as the voice data is actually exchanged between media aggregation managers over the network it gets RSVP treatment, reserved bandwidth, and QoS. Advantageously, this solution serves as a surrogate to route calls over the pre-created RSVP pipes eliminating QoS processing by endpoints, without any deviations from each involved standard protocol.

Figure 17:
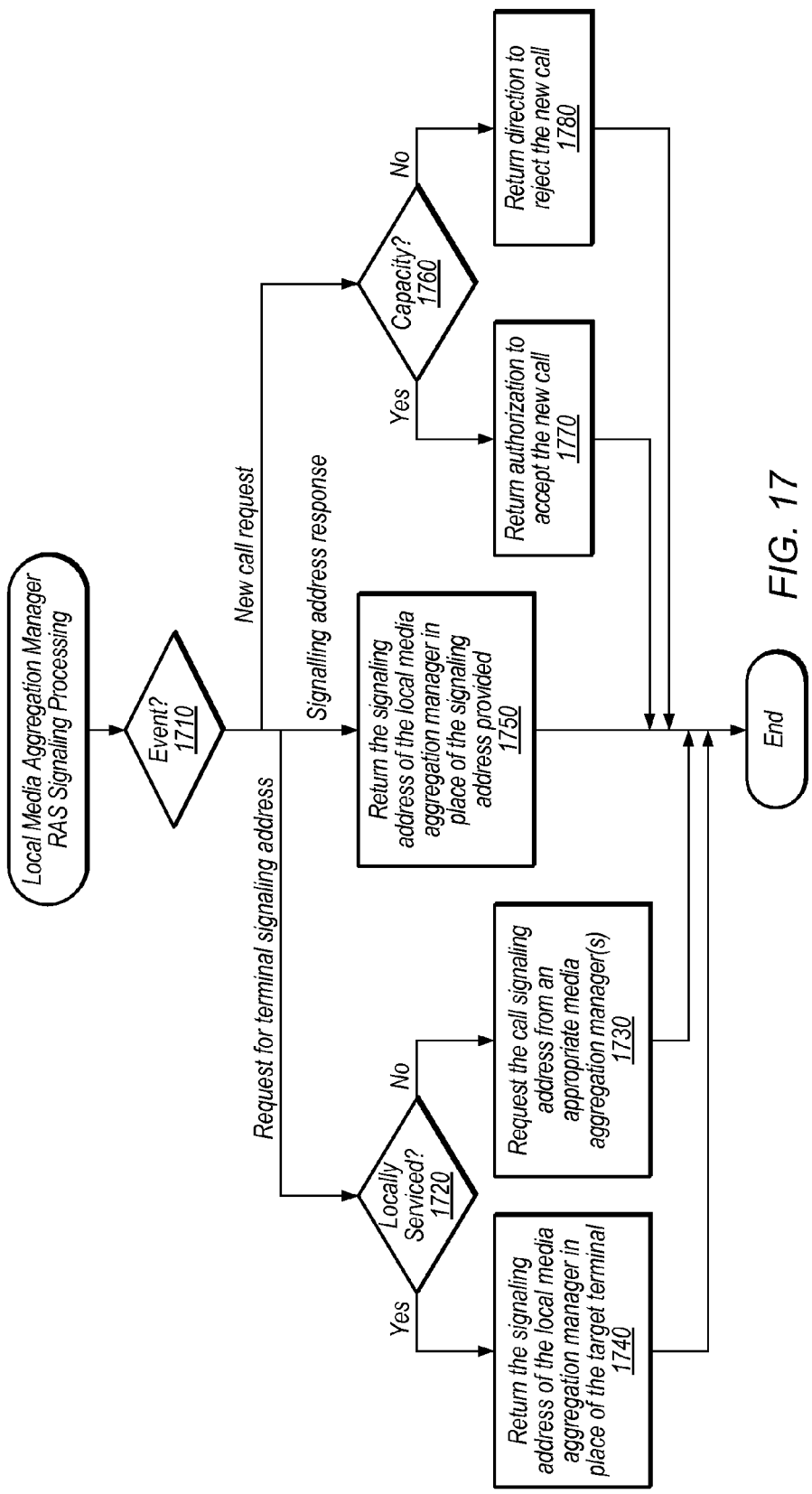
FIG. 17 is a flow diagram illustrating Registration, Admission, Status (RAS) signaling processing according to one embodiment of the present invention.

Referring now to FIG. 17, a flow diagram illustrating exemplary Registration, Admission, Status (RAS) signaling processing will now be described. At decision block 1710, the appropriate processing path is determined based upon the triggering event. If the event is a request for a terminal's signaling address then processing proceeds to decision block 1720. If the event represents a signaling address response, then control flow branches to processing block 1750. However, if the event is a new call request, then processing continues with decision block 1760.

At decision block 1720, in response to a request for a terminal signaling address, a determination is made whether or not the terminal is locally serviced. If it is determined that the terminal is not serviced by the media aggregation manager 1300, then processing continues with processing block 1730; otherwise processing proceeds to processing block 1740.

At processing block 1730, the media aggregation manager 1300 requests the call signaling address from an appropriate remote media aggregation manager. For example, the local media aggregation manager may transmit a multicast message or a directed broadcast to locate the appropriate remote media aggregation manager that services the desired terminal.

At processing block 1740, the media aggregation manager 1300 returns its own signaling address rather than the signaling address of the locally serviced terminal. In this manner, subsequent call signaling and control signaling is routed through the local media aggregation manager rather than letting the locally service terminal handle this signaling directly.

At processing block 1750, in response to a signaling address response, the media aggregation manager 1300, as above, returns its signaling address in place of the signaling address of the locally serviced terminal to abstract call and control signaling from the locally serviced terminal.

At decision block 1760, in response to a new call request on the RAS channel of the media aggregation manager 1300, a determination is made whether there is capacity for the new call. For example, the local resource manager verifies whether the reservation protocol session over which the new call will be multiplexed can accommodate the additional bandwidth requirements of the new call. At any rate, if the local resource manager determines that the reservation protocol session has adequate resources for the new call, then processing continues to processing block 1770. Otherwise, control flows to processing block 1780.

At processing block 1770, the media aggregation manager 1300 returns an indication that the new call can be accepted. At processing block 1780, the media aggregation manager 1300 returns direction to reject the new call.

Figure 18:
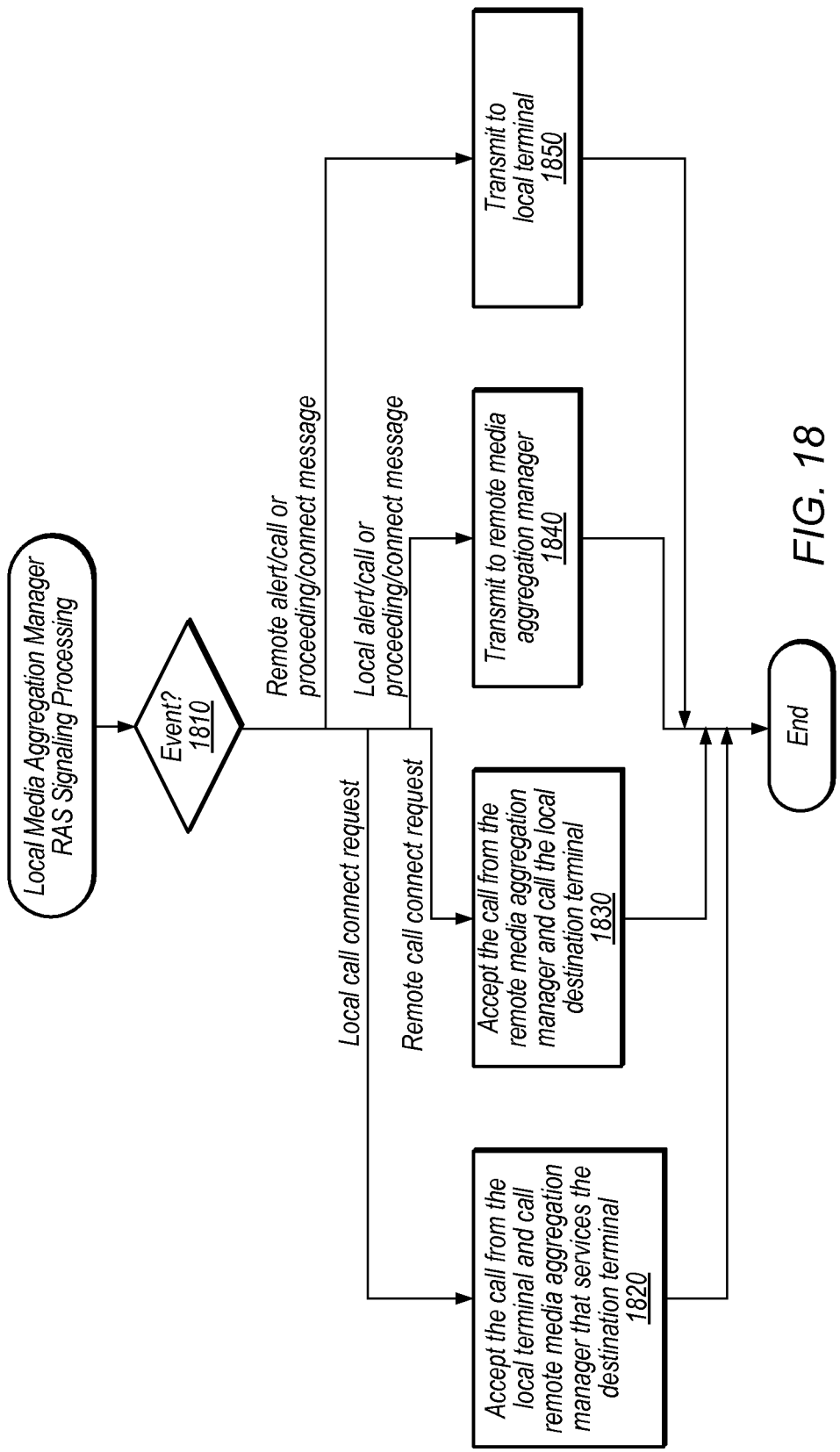
FIG. 18 is a flow diagram illustrating call signaling processing according to one embodiment of the present invention.

FIG. 18 is a flow diagram illustrating call signaling processing according to one embodiment of the present invention. At decision block 1810, the appropriate processing path is determined based upon the event that has triggered the call signaling processing tread. If the event is a local call connect request, the processing proceeds to processing block 1820. If the event represents a remote call connect request, then control flow branches to processing block 1830. If the event is a local alerting/call or proceeding/connect message, then processing continues with processing block 1840. However, if the event is a remote alerting/call or proceeding/connect message, the processing proceeds with processing block 1850.

At processing block 1820, in response to a local call connect request, the media aggregation manager 1300 accepts the call from the local terminal and calls the remote media aggregation manager that services the destination terminal. In this manner, the local media aggregation manager poses as the intended receiver to its local terminals that are callers.

At processing block 1830, in response to a remote call connect request, the media aggregation manager 1300 accepts the call from the remote media aggregation manager and calls the intended recipient, e.g., one of the terminals serviced by the local media aggregation manager. In this manner, the local media aggregation manager poses as a caller to its local terminals that are receivers.

At processing block 1840, in response to a local alerting/call or proceeding/connect message, the local media aggregation manager relays the message to the appropriate remote media aggregation manager(s).

At processing block 1850, in response to a remote alerting/call or proceeding/connect message, the local media aggregation manager relays the message to the appropriate local terminal(s). After processing block 1850, call signaling is complete and control protocol signaling (e.g., H.245) can begin.

Figure 19:
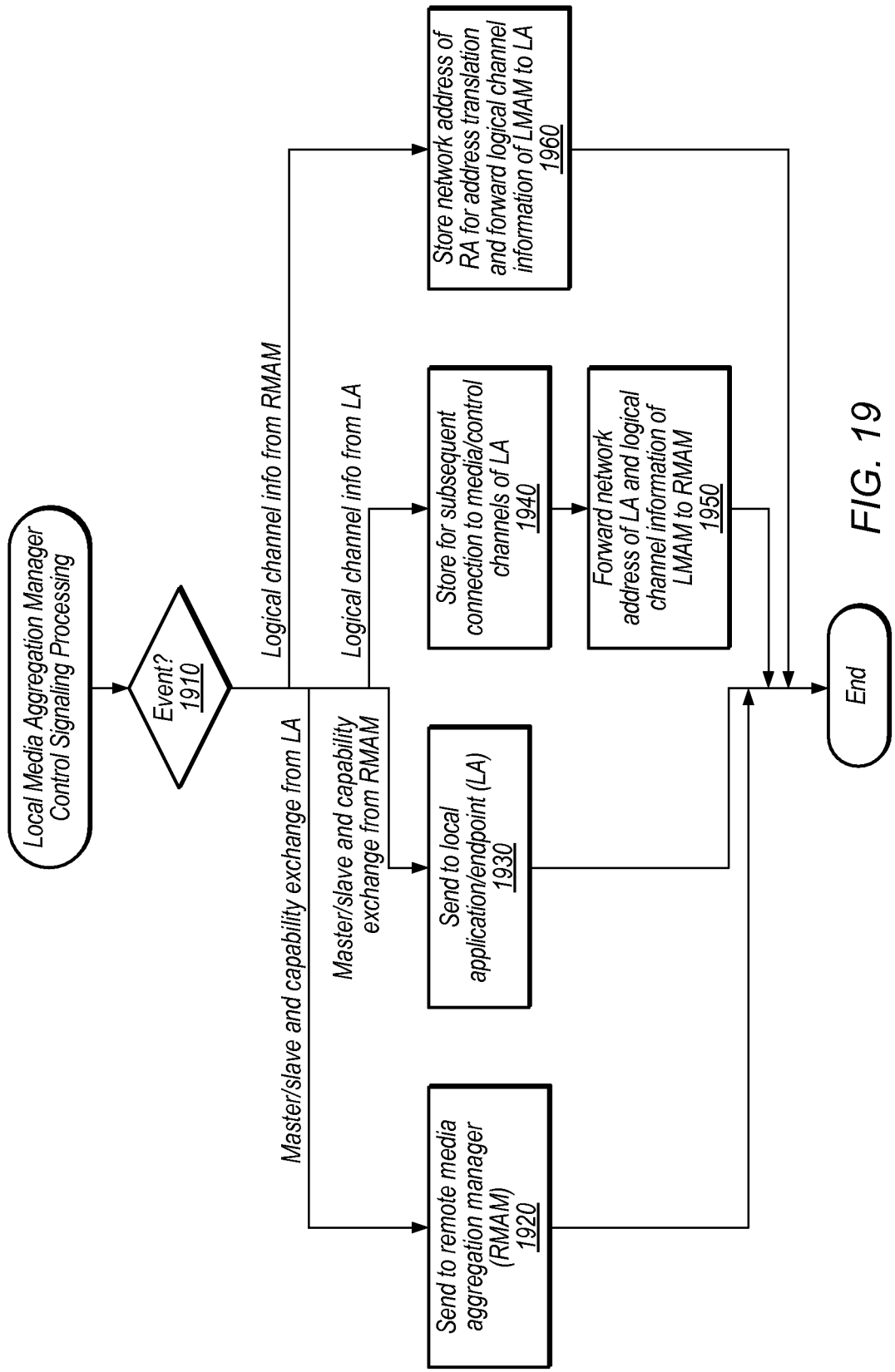
FIG. 19 is a flow diagram illustrating control signaling processing according to one embodiment of the present invention.

FIG. 19 is a flow diagram illustrating control signaling processing according to one embodiment of the present invention. At decision block 1910, the appropriate processing path is determined based upon the event that has triggered the control signaling processing tread. If the event is receipt of a master/slave and capability exchange from a local application/endpoint, the processing proceeds to processing block 1920. If the event represents receipt of a master/slave and capability exchange from a remote media aggregation manager, then control flow branches to processing block 1930. If the event is receipt of logical channel information from a local application/endpoint, then processing continues with processing block 1940. However, if the event is reception of logical channel information from a remote media aggregation manager, the processing proceeds with processing block 1950.

At processing block 1920, the master/slave and capability exchange is transmitted to the remote media aggregation manager.

At processing block 1930, the master/slave and capability exchange is transmitted to the local application/endpoint.

At processing block 1940, the logical channel information from the local application/endpoint is stored in anticipation of making a connection with the media and/or control channels of the local application/endpoint. At processing block 1950, the LMAM forwards its own logical channel information to the RMAM. Additionally, the network address of the LA is sent to the RMAM.

At processing block 1960, the network address of the RA is stored in a lookup table for address translation and the logical channel information of the LMAM is forwarded to the LA.

Figure 20:
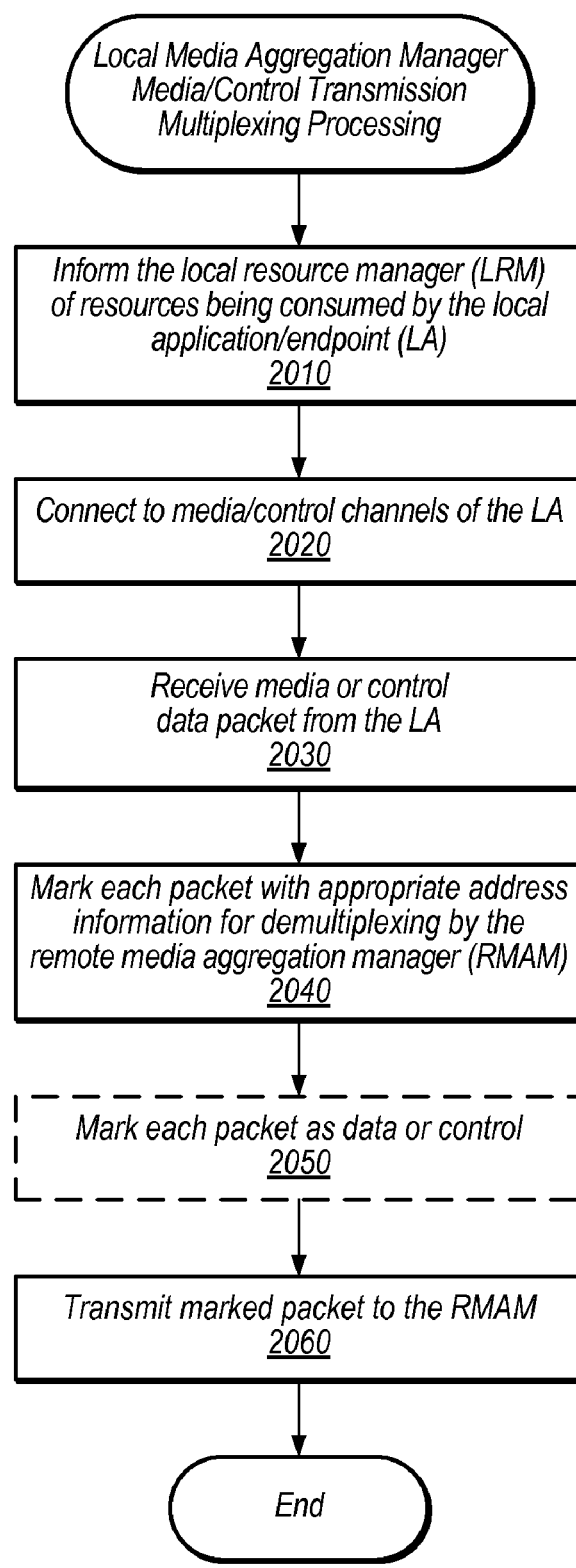
FIG. 20 is a flow diagram illustrating media/control transmission multiplexing processing according to one embodiment of the present invention.

FIG. 20 is a flow diagram illustrating media/control transmission multiplexing processing according to one embodiment of the present invention. At processing block 2010, the local media multiplexor reports the resources being consumed by the local application/endpoint to the local resource manager.

At processing block 2020, the media aggregation manager 1300 connects to the media and/or control channels of the local application/endpoint.

At processing block 2030, media and control data packets are generated by the local application/endpoint and received by the local media multiplexor. The media multiplexor 1350 takes packets coming from either the control or media channels of the local application/endpoint and sends them to the appropriate remote media aggregation manager(s). According to this example, the media multiplexor 1350 marks the outbound packets with appropriate address information (referred to as a "tag") for demultiplexing at the remote media aggregation manager. The tag is typically appended to transport protocol packets, such as TCP or RTP packets, to allow the media multiplexor 1350 to direct packets to the appropriate remote application/endpoint. According to one embodiment, the tag includes address information, such as the destination network address associated with the remote application/endpoint. The destination network address may be determined with reference to a lookup table that allows translation between the source network address associated with the local application/endpoint and the destination network address associated with the remote application/endpoint. Alternatively, a lookup table may be maintained on the media demultiplexor 1360 and the tag would include the source network address associated with the local application/endpoint. Then, the source network address would be used by the remote media demultiplexor to determine how to route the inbound packet to the appropriate remote application/endpoint.

When different channels or ports are used for transport and control protocols (such as RTP and RTCP), then the tag may also include additional protocol dependent control information to allow multiplexing of data and control packets onto the reservation protocol session. Therefore, at optional processing block 2050, each outbound packet may additionally be marked as control or data to allow the remote media aggregation manager to determine the appropriate channel/port of the remote application/endpoint on which to forward the packet.

Finally, at processing block 2060, the marked packet is transmitted to the appropriate remote media aggregation manager(s).

Figure 21:
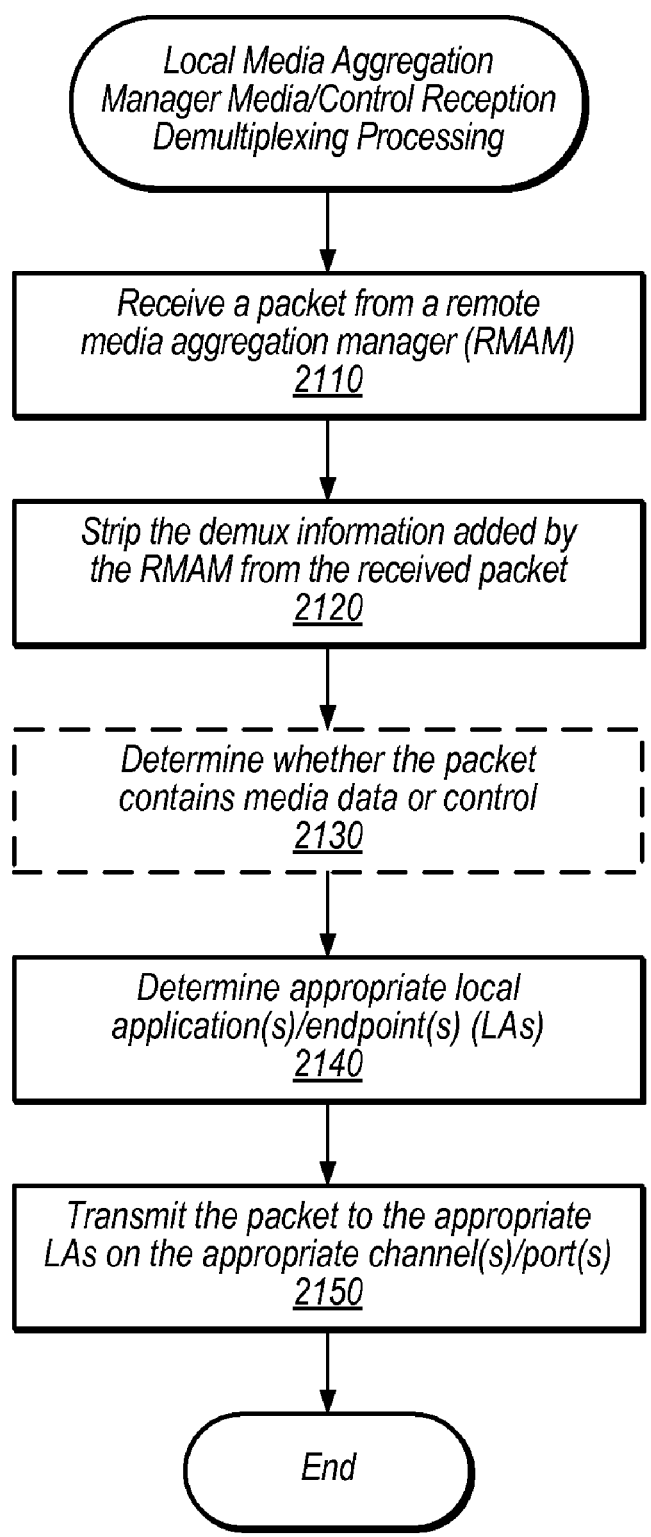
FIG. 21 is a flow diagram illustrating media/control reception demultiplexing processing according to one embodiment of the present invention.

FIG. 21 is a flow diagram illustrating media/control reception demultiplexing processing according to one embodiment of the present invention. At processing block 2110, a packet is received from a remote media aggregation manager. The demultiplexing information (e.g., the tag) added by the remote media multiplexor is stripped from the packet and examined at processing block 2120. Optionally, at processing block 2130, if control and data packets are being multiplexed onto the reservation protocol session, a determination is made whether the packet is a media packet or a control packet based upon the tag. At processing block 2140, the appropriate local application(s)/endpoint(s) to which the packet is destined is/are determined. As described above, the media multiplexor 1350 may perform address translation from a source network address to a destination network address. In this case, the media demultiplexor 1360 determines the appropriate local application(s)/endpoint(s) that are to receive the packet by examining the address portion of the tag. Alternatively, if the media multiplexor 1350 leaves the source network address in the address portion of the tag, then the media demultiplexor 1360 determines the appropriate local application(s)/endpoint(s) by first translating the address portion using a local lookup table, for example.

In any event, finally, at processing block 2150, the media demultiplexor 1360 transmits the packet to those of the local application(s)/endpoint(s) identified in processing block 2140. If, according to the particular transport and/or control protocols employed, the application(s)/endpoint(s) receive media packets and control packets on different channels/ports, then the packet is forwarded onto the appropriate channel/port of the local application(s)/endpoints(s) based on the packet classification performed at processing block 2130.

Figure 22:
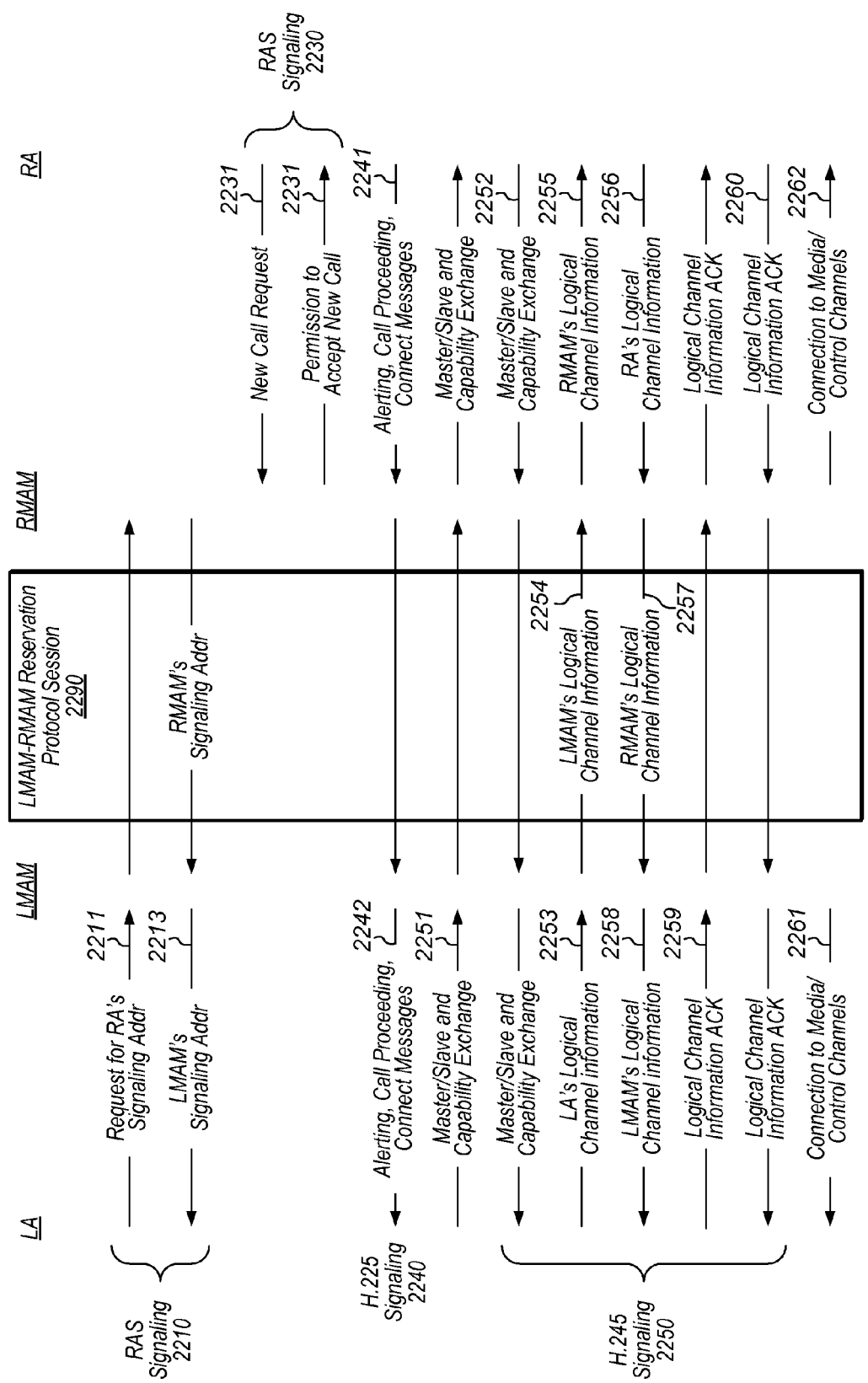
FIG. 22 conceptually illustrates application session establishment in an H.323 environment according to one embodiment of the present invention.

FIG. 22 conceptually illustrates application session establishment in an H.323 environment according to one embodiment of the present invention. In general, the media aggregation managers abstract the true application session endpoints from each other and serve as proxies for their respective local applications/endpoints. As explained above, the media aggregation managers accomplish this by intercepting signaling messages originating from their respective local applications/endpoints and modifying the signaling messages to make themselves appear as the actual callers/recipients.

In this illustration, for simplicity, it is assumed that a single local application/endpoint (LA) is establishing an application session with a single remote application/endpoint (RA) over a pre-allocated reservation protocol session 2290 between a local media aggregation manager (LMAM) geographically proximate to the LA and a remote media aggregation manager (RMAM) geographically proximate to the RA.

According to this example, application session establishment involves RAS signaling 2210 and 2230, H.225 signaling 2240, and H.245 signaling 2250. RAS signaling 2210 begins with a request for the RA signaling address 2211 by the LA to the LMAM. The LMAM transmits the request 2211 via the reservation protocol session 2290 to the RMAM. In response to the request 2211, the RMAM decides it wants to route H.225/H.245 signaling through it instead of letting the RA do it directly. Therefore, the RMAM replies with a packet 2212 containing RMAM's signaling address. Similarly, the LMAM decides it wants to route H.225/H.245 signaling through it instead of letting the LA do it directly. Therefore, the LMAM substitutes its signaling address for that of the RMAM and forwards packet 2213 to the LA.

RAS signaling continues with the RA asking the RMAM (on its RAS channel) if it is okay to accept a new call by sending the RMAM a new call request 2231. The RMAM authorizes the new call by responding with a packet 2231 giving the RA permission to accept the new call.

H.225 signaling comprises the RA sending H.225 alerting/call proceeding/connect messages 2241 to the RMAM. The RMAM sends the same to the LMAM; and the LMAM sends the same to the LA. At this point, the LA determines that H.225 call signaling is complete and starts H.245 signaling.

H.245 signaling begins with the LA sending master/slave and capability exchange messages 2251 to the LMAM, which are relayed to the RMAM and from the RMAM to the RA. Then, the RA sends master/slave and capability exchange messages 2252 to the RMAM. The RMAM transmits these messages to the LMAM; and the LMAM forwards them to the LA.

Subsequently, the LA initiates an exchange of logical channel information by sending logical channel information packets 2253 to the LMAM. The logical channel information identifies the network address (e.g., IP address) and port numbers where RTP/RTCP connections will be accepted. The LMAM stores the LA's logical channel information and passes its own connection information 2254 to the RMAM. Additionally, the LMAM provides the network address of the LA to the RMAM for later use in address translation lookups. As mentioned above, the network address of the LA may be used by the RMM or the RMD depending upon where the address translation lookup is performed. The RMAM remembers the information provided by the LMAM and generates its own RTP/RTCP information 2255 and passes it to the RA.

After receiving logical channel information thought to be associated with the LA, the RA sends its logical channel information 2256 to the RMAM (thinking it is being directed to the LA). The RMAM stores the RA's logical channel information and passes its own connection information 2257 to the LMAM. Additionally, the RMAM provides the network address of the RA to the LMAM. The LMAM remembers the logical channel information provided by the RMAM and generates its own RTP/RTCP information 2258 and passes it to the LA.

The LA sends an ACK message 2259 to the LMAM to acknowledge receipt of what it thinks to be the RA's logical channel information. The acknowledgement is relayed to the RA by the LMAM and the RMAM. The RA also sends an ACK message 2260 to the RMAM to acknowledge receipt of what it thinks to be the LA's logical channel information. The acknowledgement is related to the LA by the RMAM and the LMAM. Finally, the LMAM and the RMAM each use the logical channel information intercepted from the LA and the RA, respectively, to connect to the media and/or control channels of the LA and RA.

Exemplary Encapsulated Packet Formats

Figure 23A:
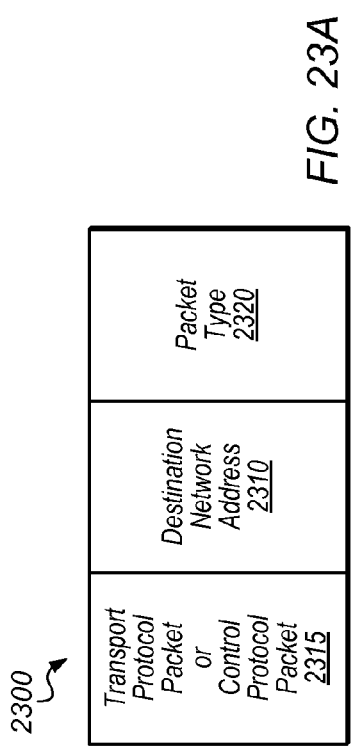
FIG. 23A illustrates the encapsulated ("MUX") packet format according to one embodiment of the present invention in which address replacement is performed by the LMAM.

FIG. 23A illustrates the encapsulated ("MUX") packet format 2300 according to one embodiment of the present invention in which address replacement is performed by the LMAM. The payload of the encapsulated packet 2300 includes a destination network address field 2310, a variable length transport or control protocol packet portion 2315, and a packet type indication 2320. The destination network address 2310 is typically the IP address of the true recipient (e.g., the application/endpoint to which the packet is destined). In environments where multiplexing of control and data is employed, the variable length portion 2315 may include either a transport protocol packet (e.g., a RTP packet) or a control protocol packet (e.g., a RTCP packet) as indicated by the packet type indication 2320. In alternative embodiments, where multiplexing of control and data is not employed, then the variable length portion 2315 would still include either control or data, but the packet type indication 2320 would no longer be necessary.

Figure 23B:
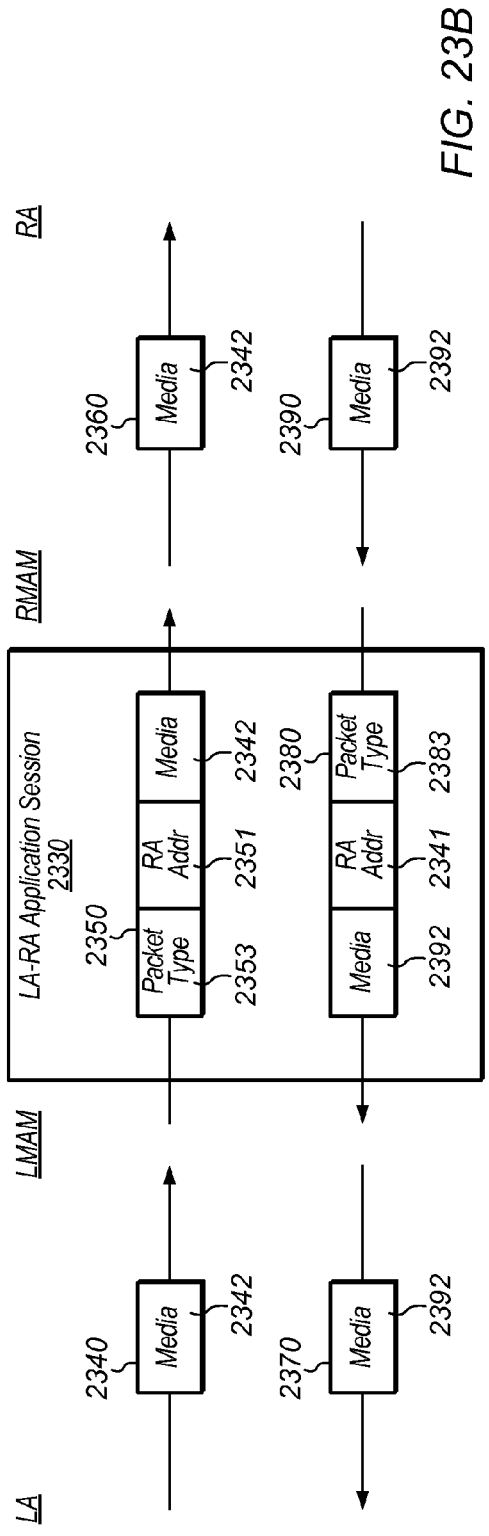
FIG. 23B illustrates media transmission in both directions according to the encapsulated packet format of FIG. 23A.

FIG. 23B illustrates media transmission in both directions according to the encapsulated packet format of FIG. 23A. When the LA originates a media packet, it generates a packet 2340 including media 2342. The LMAM encapsulates the media 2342 in the encapsulated packet format 2300 by generating an encapsulated packet 2350 that includes the RA's network address 2351, the media 2342, and a packet type indicator 2353. For example, upon receipt of packet 2340, the LMAM may append the network address of the RA and a packet type indicator 2353 based upon the channel/port upon which the packet 2340 was received. When the encapsulated packet 2350 is received by the RMAM, it strips the information added by the LMAM and forwards a packet 2360 comprising the media 2342 to the RA.

When the RA originates a media packet, it generates a packet 2390 including media 2392. The RMAM encapsulates the media 2392 in the encapsulated packet format 2300 by generating an encapsulated packet 2380 that includes the LA's network address 2341, the media 2392, and a packet type indicator 2383. For example, upon receipt of packet 2390, the RMAM may append the network address of the LA and a packet type indicator 2383 based upon the channel/port upon which the packet 2390 was received. When the encapsulated packet 2380 is received by the LMAM, it strips the information added by the RMAM and forwards a packet 2370 comprising the media 2392 to the LA.

Figure 24A:
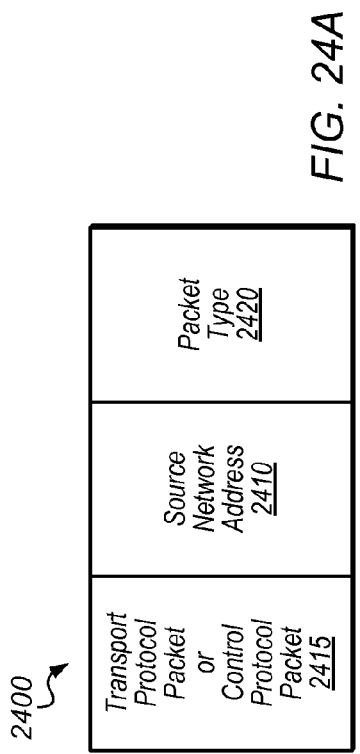
FIG. 24A illustrates the encapsulated ("MUX") packet format according to another embodiment of the present invention in which address replacement is performed by the RMAM.

FIG. 24A illustrates the encapsulated ("MUX") packet format according to another embodiment of the present invention in which address replacement is performed by the RMAM. The payload of the encapsulated packet 2400 includes a source network address field 2410, a variable length transport or control protocol packet portion 2415, and a packet type indication 2420. The source network address 2410 is typically the IP address of the true caller (e.g., the application/endpoint from which the packet is originated). In environments where multiplexing of control and data is employed, the variable length portion 2415 may include either a transport protocol packet (e.g., a RTP packet) or a control protocol packet (e.g., a RTCP packet) as indicated by the packet type indication 2420. In alternative embodiments, where multiplexing of control and data is not employed, then the variable length portion 2415 would still include either control or data, but the packet type indication 2420 would no longer be necessary.

Figure 24B:
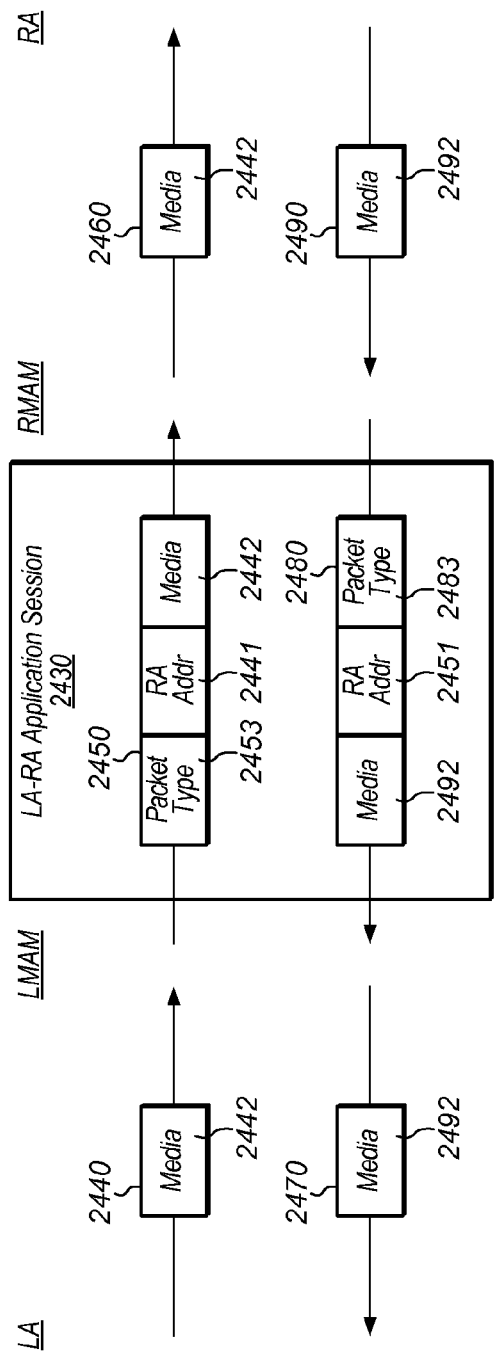
FIG. 24B illustrates media transmission in both directions according to the encapsulated packet format of FIG. 24A.

FIG. 24B illustrates media transmission in both directions according to the encapsulated packet format of FIG. 24A. When the LA originates a media packet, it generates a packet 2440 including media 2442. The LMAM encapsulates the media 2442 in the encapsulated packet format 2400 by generating an encapsulated packet 2450 that includes the LA's network address 2441, the media 2442, and a packet type indicator 2453. For example, upon receipt of packet 2440, the LMAM may append the network address of the LA and a packet type indicator 2453 based upon the channel/port upon which the packet 2440 was received. When the encapsulated packet 2450 is received by the RMAM, it strips the information added by the LMAM and forwards a packet 2460 comprising the media 2442 to the RA by looking up the network address of the RA based upon the LA's network address 2441.

When the RA originates a media packet, it generates a packet 2490 including media 2492. The RMAM encapsulates the media 2492 in the encapsulated packet format 2400 by generating an encapsulated packet 2480 that includes the RA's network address 2451, the media 2492, and a packet type indicator 2483. For example, upon receipt of packet 2480, the RMAM may append the network address of the RA and a packet type indicator 2483 based upon the channel/port upon which the packet 2480 was received. When the encapsulated packet 2480 is received by the LMAM, it strips the information added by the RMAM and forwards a packet 2470 comprising the media 2492 to the RA by looking up the network address of the LA based upon the RA's network address 2451.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   displaying, via a graphical user interface (GUI) on a display, a graphical representation of a plurality of nodes available in a network, wherein the plurality of nodes comprises a first edge node and a second edge node, wherein the plurality of nodes further comprises a plurality of router nodes located between the first edge node and the second edge node;
   displaying, via the GUI, a graphical representation of a plurality of paths available on the network between the first edge node and the second edge node on the network, wherein each of the plurality of paths passes through at least a subset of the plurality of router nodes, wherein the plurality of paths are displayed in a prioritized fashion in accordance with a difference in a number of nodes in each path of the plurality of paths through which traffic between the first edge node and the second edge node will pass if selected;

selecting a path from the plurality of paths in response to a first user input received via the GUI, wherein the selected path passes through two or more router nodes of the plurality of router nodes; and initiating configuration of the two or more router nodes for communication between the first edge node and the second edge node in response to selecting the path.

2. The method of claim 1, further comprising:
initiating establishment of a pre-allocated reservation protocol session between the first edge node and the second edge node, wherein the pre-allocated reservation protocol session is configured to use the selected path.

3. The method of claim 2,
wherein the pre-allocated reservation protocol session is configured to use one or more other paths of the plurality of paths in addition to the selected path.

4. The method of claim 1, further comprising:
initiating establishment of a session between the first edge node and the second edge node using the selected path, wherein the first edge node and the second edge node are configured to communicate to each other using one or more application sessions, wherein each application session is associated with a respective media stream, and wherein the respective media streams for the one or more application sessions are multiplexed into a first multiplexed stream transmitted between the first edge node and the second edge node using the selected path.

5. The method of claim 1,
wherein the first edge node and the second edge node comprise media aggregation managers configured to provide multiplexing/demultiplexing of media traffic between the media aggregation managers.

6. The method of claim 1,
wherein the plurality of nodes further comprises a plurality of community nodes, wherein each edge node is coupled to one or more community nodes; and
wherein said displaying the plurality of nodes comprises displaying the first edge node and the second edge node such that they are visually distinguishable from the other displayed nodes on the network.

7. The method of claim 1, further comprising:
prior to said initiating configuration of the two or more router nodes, receiving a request to analyze the selected path; and
determining a predicted link utilization schedule for the selected path that uses the two or more router nodes.

8. The method of claim 7, further comprising:
wherein said determining the predicted link utilization schedule comprises calculating and using one or more of:
a predicted increase in bandwidth allocation for each of the two or more router nodes assuming establishing a single reservation protocol session between the first edge node and the second edge node, wherein the pre-allocated reservation protocol is configured to use the selected path; or
a current bandwidth allocation for each of the two or more router nodes.

9. The method of claim 8, further comprising:
displaying on the display the predicted link utilization schedule for the selected path.

10. A machine-readable medium that stores processor executable program instructions for configuring a network, the program instructions comprising:
instructions to display, via a graphical user interface (GUI) on a display, a graphical representation of a plurality of nodes available in a network, wherein the plurality of nodes comprises a first edge node and a second edge node, wherein the plurality of nodes further comprises a plurality of router nodes located between the first edge node and the second edge node;

instructions to display, via the GUI, a graphical representation of a plurality of paths available on the network between the first edge node and the second edge node on the network, wherein each of the plurality of paths passes through at least a subset of the plurality of router nodes, wherein the plurality of paths are displayed in a prioritized fashion in accordance with a difference in a number of nodes in each path of the plurality of paths through which traffic between the first edge node and the second edge node will pass if selected;

instructions to select a path from the plurality of paths displayed on the display in response to a first user input received via the GUI, wherein the selected path passes through two or more router nodes of the plurality of router nodes; and instructions to initiate configuration of the two or more router nodes for communication between the first edge node and the second edge node in response to the selecting the path.

11. The machine-readable medium of claim 10, wherein the program instructions further comprise:
instructions to initiate establishment of a pre-allocated reservation protocol session between the first edge node and the second edge node, wherein the pre-allocated reservation protocol session is configured to use the selected path.

12. The machine-readable medium of claim 11,
wherein the pre-allocated reservation protocol session is configured to use a second path of the plurality of paths in addition to the selected path.

13. The machine-readable medium of claim 10, wherein the program instructions further comprise:
instructions to initiate establishment of a session between the first edge node and the second edge node using the selected path, wherein the first edge node and the second edge node are configured to communicate to each other using one or more application sessions, wherein each application session is associated with a respective media stream, and wherein the respective media streams for the one or more application sessions are multiplexed into a first multiplexed stream transmitted between the first edge node and the second edge node using the selected path.

14. The machine-readable medium of claim 10,
wherein the first edge node and the second edge node comprise media aggregation managers configured to provide multiplexing/demultiplexing of media traffic between the media aggregation managers.

15. The machine-readable medium of claim 10,
wherein the plurality of nodes further comprises a plurality of community nodes, wherein each edge node is coupled to one or more community nodes; and
wherein said instructions to display the plurality of nodes instructions to display the first edge node and the second edge node such that they are visually distinguishable from the other displayed nodes on the network.

16. The machine-readable medium of claim 10, wherein the plurality of paths are further displayed in a prioritized fashion in accordance with one or more additional factors, wherein the one or more additional factors include one or more of:
available bandwidth for each path of the plurality of paths;
propagation speed for communication between nodes in each path of the plurality of paths; or
physical length of travel between nodes in the network for each path of the plurality of paths.

17. The machine-readable medium of claim 10, wherein the program instructions further comprise:
instructions to, prior to initiating configuration of the two or more router nodes, receive a request to analyze the selected path; and
instructions to determine a predicted link utilization schedule for the selected path that uses the two or more router nodes.

18. The machine-readable medium of claim 17, wherein, in determining the predicted link utilization schedule, the program instructions are further executable to calculate and use one or more of:
a predicted increase in bandwidth allocation for each of the two or more router nodes assuming establishing a single reservation protocol session between the first edge node and the second edge node, wherein the pre-allocated reservation protocol is configured to use the selected path; or
a current bandwidth allocation for each of the two or more router nodes.

19. The machine-readable medium of claim 18, wherein the program instructions further comprise:
instructions to display on the display the predicted link utilization schedule for the selected path.

20. A system for configuring a network, the system comprising:
a display;
a processor;
a machine-readable medium coupled to the processor, wherein the machine-readable medium stores program instructions that are executable by the processor to:
display, via a graphical user interface (GUI), a graphical representation of a plurality of nodes available in a network on the display, wherein the plurality of nodes comprises a first edge node and a second edge node, wherein the plurality of nodes further comprises a plurality of router nodes located between the first edge node and the second edge node;
display, via the GUI, a graphical representation of a plurality of paths available on the network between the first edge node and the second edge node on the network on the display, wherein each of the plurality of paths passes through at least a subset of the plurality of router nodes, wherein the plurality of paths are displayed in a prioritized fashion in accordance with a difference in a number of nodes in each path of the plurality of paths through which traffic between the first edge node and the second edge node will pass if selected;
select a path from the plurality of paths in response to a first user input received via the GUI, wherein the selected path passes through two or more router nodes of the plurality of router nodes; and
initiate configuration of the two or more router nodes for communication between the first edge node and the second edge node in response to selecting the path.

21. The system of claim 20, wherein the program instructions are further executable to:
initiate establishment of a pre-allocated reservation protocol session between the first edge node and the second edge node, wherein the pre-allocated reservation protocol session is configured to use the selected path.

22. The system of claim 20, wherein the program instructions are further executable to:
initiate establishment of a session between the first edge node and the second edge node using the selected path, wherein the first edge node and the second edge node are configured to communicate to each other using one or more application sessions, wherein each application session is associated with a respective media stream, and wherein the respective media streams for the one or more application sessions are multiplexed into a first multiplexed stream transmitted between the first edge node and the second edge node using the selected path.

23. A system comprising:
a first one or more hardware components including means for displaying, via a graphical user interface (GUI) on a display, a graphical representation of a plurality of nodes available in a network, wherein the plurality of nodes comprises a first edge node and a second edge node, wherein the plurality of nodes further comprises a plurality of router nodes located between the first edge node and the second edge node;
the first one or more hardware components further including means for displaying, via the GUI, a graphical representation of a plurality of paths available on the network between the first edge node and the second edge node on the network, wherein each of the plurality of paths passes through at least a subset of the plurality of router nodes, wherein the plurality of paths are displayed in a prioritized fashion in accordance with a difference in a number of nodes in each path of the plurality of paths through which traffic between the first edge node and the second edge node will pass if selected;
means for selecting a path from the plurality of paths in response to a first user input received via the GUI, wherein the selected path passes through two or more router nodes of the plurality of router nodes; and
means for initiating configuration of the two or more router nodes for communication between the first edge node and the second edge node in response to the selecting the path.

24. The system of claim 23, further comprising means for initiating establishment of a pre-allocated reservation protocol session between the first edge node and the second edge node, wherein the pre-allocated reservation protocol session is configured to use the selected path.

* * * * *

UNITED STATES PATENT AND TRADEMARK OFFICE
CERTIFICATE OF CORRECTION

PATENT NO. : 8,032,646 B2
APPLICATION NO. : 11/183156
DATED : October 4, 2011
INVENTOR(S) : Nag et al.

It is certified that error appears in the above-identified patent and that said Letters Patent is hereby corrected as shown below:

On the Title Page, item (57), under "Abstract", Line 7, delete "preallocated" and insert -- pre-allocated --.

On the Title Page, item (57), under "Abstract", Line 17, delete "preallocated" and insert -- pre-allocated --.

On Title Page 2, item (56), under "Other Publications", Line 8, delete "RSVPtunnels" and insert -- RSVP tunnels --.

On Title Page 3, item (56), under "Other Publications", Line 2, delete "'997;" and insert -- '97; --.

On Title Page 3, item (56), under "Other Publications", Line 11, delete "IPv4 and IPv4 and IPv6" and insert -- IPv4 and IPv6 --.

On Title Page 3, item (56), under "Other Publications", Line 38, delete ""MeraVoice" and insert -- "MERA Voice --.

On Title Page 4, item (56), under "Other Publications", Line 8, delete "pages" and insert -- pages. --.

On Title Page 4, item (56), under "Other Publications", Line 8, delete "NetiQ:" and insert -- NetIQ: --.

On Title Page 4, item (56), under "Other Publications", Line 22, delete "netiQ" and insert -- NetIQ --.

On Title Page 4, item (56), under "Other Publications", Line 23, delete "at." and insert -- at --.

On Title Page 4, item (56), under "Other Publications", Line 23, delete "netig." and insert -- netiq. --.

On Title Page 4, item (56), under "Other Publications", Line 28, delete "(1 pages)." and insert -- (1 page). --.

Signed and Sealed this
Third Day of July, 2012

David J. Kappos
*Director of the United States Patent and Trademark Office*

CERTIFICATE OF CORRECTION (continued)
U.S. Pat. No. 8,032,646 B2

On Title Page 4, item (56), under "Other Publications", Line 35, delete "at::" and insert -- at: --.

On Title Page 4, item (56), under "Other Publications", Line 38, delete "Micromuse. Inc.," and insert -- Micromuse, Inc., --.

On Title Page 4, item (56), under "Other Publications", Line 41, delete "IP, Telephony" and insert -- IP Telephony --.

On Title Page 4, item (56), under "Other Publications", Lines 53-54, delete "Topology-/Based /RCA," and insert -- Topology-Based/RCA, --.

On Title Page 4, item (56), under "Other Publications", Lines 65-66, delete "/integretion/" and insert -- /integration/ --.

On Title Page 5, item (56), under "Other Publications", Line 1, delete "QOS" and insert -- QoS --.

On Title Page 5, item (56), under "Other Publications", Line 42, delete "Hp" and insert -- HP --.

On Title Page 5, item (56), under "Other Publications", Line 47, delete "QOS" and insert -- QoS --.

On Title Page 5, item (56), under "Other Publications" Line 53, delete "EIC a Technical Overview";" and insert -- EIC: A Technical Overview"; --.

On Title Page 5, item (56), under "Other Publications", Line 57, delete "Issue ," and insert -- Issue, --.

Column 1, line 3, in Claim 1, below Title
insert -- CROSS-REFERENCE TO RELATED APPLICATIONS --.

Column 26, lines 31-32, in Claim 10, delete "to the selecting" and insert -- to selecting --.

Column 26, lines 66-67, in Claim 15, delete "nodes instructions" and insert -- nodes comprise instructions --.

Column 28, line 53, in Claim 23, delete "to the selecting" and insert -- to selecting --.